United States Patent
Ray et al.

(10) Patent No.: US 12,075,134 B2
(45) Date of Patent: Aug. 27, 2024

(54) CROSS-SCREEN MEASUREMENT ACCURACY IN ADVERTISING PERFORMANCE

(71) Applicant: VideoAmp, Inc., Santa Monica, CA (US)

(72) Inventors: Debajyoti Ray, Marina del Rey, CA (US); Ross McCray, Santa Monica, CA (US); David Gullo, Laguna Hills, CA (US); Jay Prasad, San Francisco, CA (US)

(73) Assignee: VideoAmp, Inc., Santa Monica, CA (US)

( * ) Notice: Subject to any disclaimer, the term of this patent is extended or adjusted under 35 U.S.C. 154(b) by 0 days.

(21) Appl. No.: 16/782,006

(22) Filed: Feb. 4, 2020

(65) Prior Publication Data
US 2021/0185408 A1 Jun. 17, 2021

Related U.S. Application Data

(63) Continuation of application No. 15/219,268, filed on Jul. 25, 2016, now Pat. No. 10,555,050.
(Continued)

(51) Int. Cl.
*G06Q 30/0242* (2023.01)
*G06Q 30/0251* (2023.01)
(Continued)

(52) U.S. Cl.
CPC ........ *H04N 21/812* (2013.01); *G06Q 30/0242* (2013.01); *G06Q 30/0251* (2013.01);
(Continued)

(58) Field of Classification Search
CPC .............. H04N 21/812; H04N 21/252; H04N 21/2543; H04N 21/25833;
(Continued)

(56) References Cited

U.S. PATENT DOCUMENTS

| | | | |
|---|---|---|---|
| 3,180,891 | A | 4/1965 | Ellzey, Jr. et al. |
| 6,009,407 | A | 12/1999 | Garg |

(Continued)

FOREIGN PATENT DOCUMENTS

| | | |
|---|---|---|
| CN | 104054055 A | 9/2014 |
| WO | 2017019643 A1 | 2/2017 |

(Continued)

OTHER PUBLICATIONS

"Adapt.tv Debuts Programmatic TV", Mar. 6, 2014, Wireless News, 5 Pages, Retrieved from Proquest Technology Collection, https://search.proquest.com/docview/1504287899?accountid=142944 (retrieved on Sep. 22, 2016).

(Continued)

*Primary Examiner* — Jefferey F Harold
*Assistant Examiner* — Alexander Boyd
(74) *Attorney, Agent, or Firm* — Buchalter; Jason W. Croft

(57) ABSTRACT

The present invention is directed to statistical methods for measuring cross-screen efficacy as it relates to advertising. The improved statistical methods provide the ability for advertisers and advertising agencies to predict the behaviors of consumers based on their aggregated cross-screen behavior. The system creates a new output that includes optimized user segments and classifications. A second part of the output is improved measurement and prediction of future consumer behaviors based on the processed multisided data on cross-screen behavior.

19 Claims, 7 Drawing Sheets

Related U.S. Application Data

(60) Provisional application No. 62/264,764, filed on Dec. 8, 2015, provisional application No. 62/196,898, filed on Jul. 24, 2015.

(51) Int. Cl.
  *H04N 21/25* (2011.01)
  *H04N 21/2543* (2011.01)
  *H04N 21/258* (2011.01)
  *H04N 21/2668* (2011.01)
  *H04N 21/45* (2011.01)
  *H04N 21/466* (2011.01)
  *H04N 21/81* (2011.01)

(52) U.S. Cl.
  CPC ....... *H04N 21/252* (2013.01); *H04N 21/2543* (2013.01); *H04N 21/25883* (2013.01); *H04N 21/25891* (2013.01); *H04N 21/2668* (2013.01); *H04N 21/4532* (2013.01); *H04N 21/4667* (2013.01)

(58) Field of Classification Search
  CPC ......... H04N 21/25891; H04N 21/2668; H04N 21/4532; H04N 21/4667; G06Q 30/0242; G06Q 30/0251
  See application file for complete search history.

(56) References Cited

U.S. PATENT DOCUMENTS

| | | | |
|---|---|---|---|
| 6,055,573 A | 4/2000 | Gardenswartz et al. |
| 6,061,691 A | 5/2000 | Fox |
| 6,119,101 A | 9/2000 | Peckover |
| 6,253,187 B1 | 6/2001 | Fox |
| 6,286,005 B1 | 9/2001 | Cannon |
| 6,298,330 B1 | 10/2001 | Gardenswartz et al. |
| 6,567,824 B2 | 5/2003 | Fox |
| 6,868,389 B1 | 3/2005 | Wilkins et al. |
| 6,895,387 B1 | 5/2005 | Roberts et al. |
| 6,920,464 B2 | 7/2005 | Fox |
| 6,937,996 B1 | 8/2005 | Forsythe et al. |
| 6,993,494 B1 | 1/2006 | Boushy et al. |
| 7,062,510 B1 | 6/2006 | Eldering |
| 7,124,091 B1 | 10/2006 | Khoo et al. |
| 7,136,871 B2 | 11/2006 | Ozer et al. |
| 7,158,943 B2 | 1/2007 | Van Der Riet |
| 7,222,099 B2 | 5/2007 | Forsythe et al. |
| 7,228,287 B1 | 6/2007 | Samson et al. |
| 7,356,547 B2 | 4/2008 | Ozer et al. |
| 7,363,254 B2 | 4/2008 | Skinner |
| 7,423,406 B2 | 9/2008 | Geniusz |
| 7,444,658 B1 | 10/2008 | Matz et al. |
| 7,536,316 B2 | 5/2009 | Ozer et al. |
| 7,548,929 B2 | 6/2009 | Collins et al. |
| 7,574,404 B2 | 8/2009 | Forsythe et al. |
| 7,661,118 B2 | 2/2010 | Matz et al. |
| 7,689,590 B2 | 3/2010 | Fox |
| 7,729,940 B2 | 6/2010 | Harvey et al. |
| 7,761,346 B2 | 7/2010 | Cooper et al. |
| 7,801,778 B2 | 9/2010 | Fox |
| 7,802,280 B2 | 9/2010 | Zigmond et al. |
| 7,831,685 B2 | 11/2010 | Dai et al. |
| 7,835,937 B1 | 11/2010 | Karlsson et al. |
| 7,835,939 B1 | 11/2010 | Karlsson |
| 7,844,492 B2 | 11/2010 | Perkowski et al. |
| 7,870,023 B2 | 1/2011 | Ozer et al. |
| 7,904,327 B2 | 3/2011 | Phelan et al. |
| 7,917,388 B2 | 3/2011 | Van Der Riet |
| 7,925,549 B2 | 4/2011 | Looney et al. |
| 7,945,474 B1 | 5/2011 | Koinov |
| 7,945,928 B2 | 5/2011 | Matz et al. |
| 7,949,561 B2 | 5/2011 | Briggs |
| 7,949,562 B2 | 5/2011 | Collins |
| 7,949,563 B2 | 5/2011 | Collins |
| 7,974,889 B2 | 7/2011 | Raimbeault |
| 8,000,993 B2 | 8/2011 | Harvey et al. |
| 8,006,261 B1 | 8/2011 | Haberman et al. |
| 8,046,797 B2 | 10/2011 | Bentolila et al. |
| 8,060,398 B2 | 11/2011 | Canning et al. |
| 8,069,142 B2 | 11/2011 | Davis et al. |
| 8,090,613 B2 | 1/2012 | Kalb et al. |
| 8,099,316 B2 | 1/2012 | Moukas et al. |
| 8,099,317 B2 | 1/2012 | Moukas et al. |
| 8,099,318 B2 | 1/2012 | Moukas et al. |
| 8,099,323 B2 | 1/2012 | Veeraraghavan |
| 8,112,301 B2 | 2/2012 | Harvey et al. |
| 8,117,050 B2 | 2/2012 | Li et al. |
| 8,117,067 B2 | 2/2012 | Ketchum |
| 8,135,626 B2 | 3/2012 | Das et al. |
| 8,160,916 B2 | 4/2012 | Moukas et al. |
| 8,175,914 B1 | 5/2012 | Benson et al. |
| 8,180,891 B1 | 5/2012 | Harrison |
| 8,195,508 B1 | 6/2012 | Calder et al. |
| 8,239,242 B2 | 8/2012 | Moukas et al. |
| 8,249,925 B2 | 8/2012 | Broms et al. |
| 8,255,949 B1 | 8/2012 | Bayer et al. |
| 8,265,996 B2 | 9/2012 | Steelberg et al. |
| 8,296,793 B2 | 10/2012 | Johnson |
| 8,321,273 B2 | 11/2012 | Briggs |
| 8,321,274 B2 | 11/2012 | Collins et al. |
| 8,321,275 B2 | 11/2012 | Collins et al. |
| 8,341,047 B1 | 12/2012 | Furney et al. |
| 8,346,593 B2 | 1/2013 | Fanelli et al. |
| 8,346,607 B1 | 1/2013 | Benson et al. |
| 8,352,307 B2 | 1/2013 | Moukas et al. |
| 8,352,320 B2 | 1/2013 | MacDonald et al. |
| 8,386,310 B2 | 2/2013 | Weyer et al. |
| 8,386,398 B1 | 2/2013 | Hickman |
| 8,392,252 B2 | 3/2013 | Kaufman et al. |
| 8,401,887 B2 | 3/2013 | Moukas et al. |
| 8,402,482 B2 | 3/2013 | Woodward et al. |
| 8,417,556 B2 | 4/2013 | Moukas et al. |
| 8,423,408 B1 | 4/2013 | Barnes et al. |
| 8,442,859 B1 | 5/2013 | Broms et al. |
| 8,452,797 B1 | 5/2013 | Paleja et al. |
| 8,473,339 B1 | 6/2013 | McKennon et al. |
| 8,478,675 B1 | 7/2013 | Walia et al. |
| 8,489,460 B2 | 7/2013 | Kamath |
| 8,495,679 B2 | 7/2013 | Labeeb et al. |
| 8,504,416 B2 | 8/2013 | Calder et al. |
| 8,516,515 B2 | 8/2013 | Zigmond et al. |
| 8,527,341 B2 | 9/2013 | Feuerstein et al. |
| 8,527,342 B2 | 9/2013 | Feuerstein et al. |
| 8,533,048 B2 | 9/2013 | Charania |
| 8,533,049 B2 | 9/2013 | Flake et al. |
| 8,539,067 B2 | 9/2013 | Juda et al. |
| 8,539,072 B1 | 9/2013 | Harrison |
| 8,554,619 B2 | 10/2013 | Juda et al. |
| 8,560,385 B2 | 10/2013 | Atazky et al. |
| 8,566,224 B2 | 10/2013 | Walia et al. |
| 8,566,861 B2 | 10/2013 | Zigmond et al. |
| 8,583,659 B1 | 11/2013 | Alexandrescu et al. |
| 8,589,233 B2 | 11/2013 | Flake et al. |
| 8,620,795 B2 | 12/2013 | Veeraraghavan |
| 8,630,902 B2 | 1/2014 | Baum et al. |
| 8,639,567 B2 | 1/2014 | Winters |
| 8,645,186 B2 | 2/2014 | Moukas et al. |
| 8,650,066 B2 | 2/2014 | Shah et al. |
| 8,655,695 B1 | 2/2014 | Qu et al. |
| 8,655,730 B1 | 2/2014 | Swan et al. |
| 8,671,016 B2 | 3/2014 | Little |
| 8,700,452 B1 | 4/2014 | McKennon et al. |
| 8,700,462 B2 | 4/2014 | Collins |
| 8,732,015 B1 | 5/2014 | Beckerman et al. |
| 8,738,433 B2 | 5/2014 | DiOrio et al. |
| 8,738,446 B1 | 5/2014 | L'Heureux et al. |
| 8,744,908 B2 | 6/2014 | Kalb et al. |
| 8,751,359 B2 | 6/2014 | Walia et al. |
| 8,751,418 B1 | 6/2014 | Sutter et al. |
| 8,752,086 B2 | 6/2014 | Conant |
| 8,776,111 B1 | 7/2014 | Eldering et al. |
| 8,782,683 B2 | 7/2014 | Balakrishnan et al. |
| 8,788,345 B2 | 7/2014 | Kamath |

(56) References Cited

U.S. PATENT DOCUMENTS

| | | |
|---|---|---|
| 8,819,249 B2 | 8/2014 | Harrison |
| 8,819,255 B1 | 8/2014 | Harrison |
| 8,825,677 B2 | 9/2014 | Gausebeck et al. |
| 8,831,987 B2 | 9/2014 | Knapp et al. |
| 8,904,021 B2 | 12/2014 | Harrison |
| 8,909,771 B2 | 12/2014 | Heath |
| 8,924,465 B1 | 12/2014 | Tunguz-Zawislak |
| 8,935,721 B1 | 1/2015 | Tidwell et al. |
| 8,949,890 B2 | 2/2015 | Evans et al. |
| 8,972,281 B2 | 3/2015 | Pokonosky |
| 8,983,859 B2 | 3/2015 | Nice et al. |
| 8,990,105 B1 | 3/2015 | Shatkin-Margolis et al. |
| 9,026,886 B1 | 5/2015 | Yeo |
| 9,053,497 B2 | 6/2015 | Benyamin |
| 9,154,942 B2 | 10/2015 | Harrison et al. |
| 9,167,419 B2 | 10/2015 | Harrison |
| 9,980,010 B2 | 5/2018 | Ray et al. |
| 9,980,011 B2 | 5/2018 | Ray et al. |
| 10,085,073 B2 | 9/2018 | Ray et al. |
| 10,123,063 B1 | 11/2018 | Brown |
| 10,136,174 B2 | 11/2018 | Ray et al. |
| 10,417,658 B1* | 9/2019 | Tsemekhman ...... G06Q 30/0246 |
| 10,555,050 B2 | 2/2020 | Ray et al. |
| 10,667,020 B2 | 5/2020 | Ray et al. |
| 10,812,870 B2 | 10/2020 | Ray et al. |
| 11,425,441 B2 | 8/2022 | Ray et al. |
| 11,463,786 B2 | 10/2022 | Ray et al. |
| 11,856,272 B2 | 12/2023 | Ray et al. |
| 2002/0072966 A1 | 6/2002 | Eldering et al. |
| 2002/0151992 A1 | 10/2002 | Hoffberg et al. |
| 2002/0178447 A1 | 11/2002 | Plotnick et al. |
| 2002/0184047 A1 | 12/2002 | Plotnick et al. |
| 2003/0066068 A1 | 4/2003 | Gutta et al. |
| 2004/0098744 A1 | 5/2004 | Gutta |
| 2004/0133909 A1 | 7/2004 | Ma |
| 2005/0021397 A1 | 1/2005 | Cui et al. |
| 2005/0137958 A1 | 6/2005 | Huber et al. |
| 2006/0190330 A1 | 8/2006 | Tollinger et al. |
| 2006/0217110 A1 | 9/2006 | Othmer |
| 2006/0253328 A1 | 11/2006 | Kohli et al. |
| 2007/0028266 A1 | 2/2007 | Trajkovic et al. |
| 2007/0038509 A1 | 2/2007 | Jain et al. |
| 2007/0143186 A1 | 6/2007 | Apple et al. |
| 2007/0169143 A1 | 7/2007 | Li |
| 2007/0198355 A1 | 8/2007 | Samson et al. |
| 2008/0167943 A1 | 7/2008 | O'Neil et al. |
| 2008/0221949 A1* | 9/2008 | Delurgio ............... G06Q 10/04 |
| | | 705/7.11 |
| 2008/0271070 A1 | 10/2008 | Kanojia et al. |
| 2009/0037252 A1 | 2/2009 | Joyce |
| 2009/0091571 A1 | 4/2009 | Zalewski |
| 2009/0150215 A1 | 6/2009 | Kalb et al. |
| 2009/0150224 A1 | 6/2009 | Lu et al. |
| 2009/0171780 A1 | 7/2009 | Aldrey et al. |
| 2009/0172728 A1 | 7/2009 | Shkedi et al. |
| 2009/0199107 A1 | 8/2009 | Lewis et al. |
| 2009/0248478 A1 | 10/2009 | Duggal et al. |
| 2009/0248680 A1 | 10/2009 | Kalavade |
| 2009/0298480 A1 | 12/2009 | Khambete et al. |
| 2010/0017298 A1 | 1/2010 | Stukenborg et al. |
| 2010/0057546 A1 | 3/2010 | Wang et al. |
| 2010/0057560 A1* | 3/2010 | Skudlark ............... H04N 21/812 |
| | | 705/14.49 |
| 2010/0121671 A1 | 5/2010 | Boutilier et al. |
| 2010/0191600 A1 | 7/2010 | Sideman |
| 2010/0235219 A1 | 9/2010 | Merrick et al. |
| 2010/0250332 A1 | 9/2010 | Ghosh et al. |
| 2010/0324982 A1 | 12/2010 | Marolli |
| 2010/0324992 A1 | 12/2010 | Birch |
| 2011/0035277 A1 | 2/2011 | Kodialam et al. |
| 2011/0040611 A1 | 2/2011 | Simmons et al. |
| 2011/0040612 A1 | 2/2011 | Simmons et al. |
| 2011/0040613 A1 | 2/2011 | Simmons et al. |
| 2011/0040635 A1 | 2/2011 | Simmons et al. |
| 2011/0040636 A1 | 2/2011 | Simmons et al. |
| 2011/0106618 A1 | 5/2011 | Ben-Moshe |
| 2011/0119126 A1 | 5/2011 | Park et al. |
| 2011/0119128 A1 | 5/2011 | Fang et al. |
| 2011/0225037 A1 | 9/2011 | Tunca et al. |
| 2011/0225604 A1 | 9/2011 | Bova |
| 2011/0231242 A1 | 9/2011 | Dilling et al. |
| 2011/0231243 A1 | 9/2011 | Bhatia et al. |
| 2011/0231245 A1 | 9/2011 | Bhatia et al. |
| 2011/0231246 A1 | 9/2011 | Bhatia et al. |
| 2011/0231253 A1 | 9/2011 | Crawford et al. |
| 2011/0231264 A1 | 9/2011 | Dilling et al. |
| 2011/0238485 A1 | 9/2011 | Haumont et al. |
| 2011/0239243 A1* | 9/2011 | Dierks ................. H04N 21/812 |
| | | 725/14 |
| 2012/0005216 A1 | 1/2012 | Moritz et al. |
| 2012/0022937 A1 | 1/2012 | Bhatia et al. |
| 2012/0059713 A1 | 3/2012 | Galas et al. |
| 2012/0089455 A1 | 4/2012 | Belani et al. |
| 2012/0095863 A1 | 4/2012 | Schiff et al. |
| 2012/0120250 A1 | 5/2012 | Shintani et al. |
| 2012/0158485 A1 | 6/2012 | Ogawa |
| 2012/0158486 A1 | 6/2012 | Ogawa |
| 2012/0158487 A1 | 6/2012 | Ogawa |
| 2012/0191529 A1 | 7/2012 | Lewis et al. |
| 2012/0239809 A1 | 9/2012 | Mazumdar et al. |
| 2012/0253928 A1 | 10/2012 | Jackson et al. |
| 2012/0271708 A1 | 10/2012 | Ogawa |
| 2012/0271709 A1 | 10/2012 | Ogawa |
| 2012/0284212 A1* | 11/2012 | Lin ........................ G06N 20/00 |
| | | 706/12 |
| 2012/0303429 A1* | 11/2012 | Nolledo ................. G06Q 30/02 |
| | | 705/14.16 |
| 2012/0310745 A1 | 12/2012 | Bhatia et al. |
| 2012/0323674 A1 | 12/2012 | Simmons et al. |
| 2013/0006754 A1 | 1/2013 | Horvitz et al. |
| 2013/0054349 A1 | 2/2013 | Ogawa |
| 2013/0124309 A1* | 5/2013 | Traasdahl .......... G06Q 30/0251 |
| | | 705/14.49 |
| 2013/0185750 A1 | 7/2013 | Ayoub |
| 2013/0205339 A1 | 8/2013 | Haberman et al. |
| 2013/0262225 A1 | 10/2013 | Ahrens et al. |
| 2013/0346182 A1 | 12/2013 | Cheng et al. |
| 2014/0025660 A1 | 1/2014 | Mohammed et al. |
| 2014/0040008 A1 | 2/2014 | Belani et al. |
| 2014/0046777 A1* | 2/2014 | Markey ................. G06Q 30/02 |
| | | 705/14.66 |
| 2014/0052527 A1 | 2/2014 | Roundtree |
| 2014/0058826 A1 | 2/2014 | Ogawa |
| 2014/0095320 A1 | 4/2014 | Sivaramakrishnan et al. |
| 2014/0099623 A1 | 4/2014 | Amit et al. |
| 2014/0109123 A1 | 4/2014 | Balakrishnan et al. |
| 2014/0114773 A1 | 4/2014 | Stukenborg et al. |
| 2014/0136338 A1 | 5/2014 | Ringdahl |
| 2014/0157309 A1 | 6/2014 | Small et al. |
| 2014/0278912 A1 | 9/2014 | Hughes et al. |
| 2014/0278921 A1* | 9/2014 | Sankaran ........... G06Q 30/0245 |
| | | 705/14.44 |
| 2014/0278981 A1 | 9/2014 | Mersov et al. |
| 2014/0279036 A1 | 9/2014 | Ke et al. |
| 2014/0289017 A1 | 9/2014 | Trenkle et al. |
| 2014/0289765 A1 | 9/2014 | Kitts et al. |
| 2014/0297400 A1 | 10/2014 | Sandholm |
| 2015/0025936 A1 | 1/2015 | Garel et al. |
| 2015/0066662 A1 | 3/2015 | Knapp et al. |
| 2015/0088635 A1 | 3/2015 | Maycotte et al. |
| 2015/0112803 A1 | 4/2015 | Heiser, II et al. |
| 2015/0121418 A1 | 4/2015 | Jain et al. |
| 2015/0161186 A1 | 6/2015 | Vemuri |
| 2015/0186945 A1 | 7/2015 | Samuel et al. |
| 2015/0208110 A1 | 7/2015 | Small et al. |
| 2015/0235275 A1 | 8/2015 | Shah et al. |
| 2015/0287097 A1 | 10/2015 | Umeda |
| 2015/0339702 A1 | 11/2015 | Lin et al. |
| 2015/0350320 A1 | 12/2015 | Yang |
| 2015/0358818 A1 | 12/2015 | Dipaola |
| 2016/0092933 A1 | 3/2016 | Xu et al. |
| 2016/0112735 A1 | 4/2016 | Stephens, Jr. |
| 2016/0117718 A1 | 4/2016 | Hood et al. |
| 2016/0117740 A1 | 4/2016 | Linden et al. |

(56) References Cited

U.S. PATENT DOCUMENTS

| | | |
|---|---|---|
| 2016/0119689 A1 | 4/2016 | Hood et al. |
| 2016/0125461 A1 | 5/2016 | Sivaramakrishnan et al. |
| 2016/0267523 A1 | 9/2016 | Biswas et al. |
| 2017/0024765 A1 | 1/2017 | Barenholz et al. |
| 2017/0034591 A1 | 2/2017 | Ray et al. |
| 2017/0034592 A1 | 2/2017 | Ray et al. |
| 2017/0034593 A1 | 2/2017 | Ray et al. |
| 2017/0083941 A1 | 3/2017 | Biswas et al. |
| 2017/0099525 A1 | 4/2017 | Ray et al. |
| 2017/0142465 A1 | 5/2017 | Ray et al. |
| 2017/0208370 A1 | 7/2017 | Ray et al. |
| 2018/0338189 A1 | 11/2018 | Ray et al. |
| 2018/0376220 A1 | 12/2018 | Ray et al. |
| 2019/0149869 A1 | 5/2019 | Ray et al. |
| 2019/0373297 A1 | 12/2019 | Sarkhel et al. |
| 2020/0294086 A1 | 9/2020 | Traasdahl et al. |
| 2021/0105541 A1 | 4/2021 | Ray et al. |
| 2023/0032230 A1 | 2/2023 | Ray et al. |

FOREIGN PATENT DOCUMENTS

| | | |
|---|---|---|
| WO | 2017019645 A1 | 2/2017 |
| WO | 2017019646 A1 | 2/2017 |
| WO | 2017019647 A1 | 2/2017 |
| WO | 2017124041 A1 | 7/2017 |
| WO | 2018022144 A1 | 2/2018 |

OTHER PUBLICATIONS

Brightroll Inc., "How is Ad Inventory like Fruit?", 5 pages, Jun. 29, 2016, available at https://brightroll.com/insights/how-ad-inventory-fruit (last accessed Jul. 26, 2017).

Comscore Inc., "Cross Platform Future in Focus 2016", Whitepaper, 55 pages, Mar. 2016, available at https://www.comscore.com/insights/Presentations-and-Whitepapers/2016/2016-US-cross-Platform-Future-in-Focus (last accessed Jul. 26, 2017).

"Cross-Screen Planning Whitepaper", 13 pages, 2016, available from https://www.tubemogul.com/ (last accessed Jul. 26, 2017).

"Drawbridge Connected Consumer Graph", The Largest Independent Cross-Device Identity Solution, 7 pages, 2016, available at https://drawbridge.com/c/graph (last accessed Jul. 26, 2017).

Final Office Action for U.S. Appl. No. 17/075,639, dated Apr. 6, 2022, 27 pages.

Final Office Action for U.S. Appl. No. 17/075,639, dated Feb. 7, 2023, 28 pages.

Freewheel: "Video Monetization Report", Feb. 2016, 40 Pages, Available at https://freewheel.tv/freewheel-views/a-peel-inside-the-freewheel-video-monetization-report-q2-2016/ (last accessed Jul. 26, 2017).

International Search Report and Written Opinion for PCT/US2016/043952 mailed Oct. 6, 2016, 8 pages.

International Search Report and Written Opinion for PCT/US2016/043954 mailed Dec. 12, 2016, 13 pages.

International Search Report and Written Opinion for PCT/US2016/043955 mailed Nov. 29, 2016, 19 pages.

International Search Report and Written Opinion for PCT/US2016/043958 mailed Nov. 29, 2016, 12 pages.

International Search Report and Written Opinion for PCT/US2017/013569 mailed Apr. 14, 2017, 13 pages.

International Search Report and Written Opinion for PCT/US2017/015870 mailed May 19, 2017, 17 pages.

Non-Final Office Action for U.S. Appl. No. 15/219,259, dated Jun. 15, 2017, 13 pages.

Non-Final Office Action for U.S. Appl. No. 15/219,262, dated Jun. 1, 2017, 30 pages.

Non-Final Office Action for U.S. Appl. No. 15/219,264, dated Apr. 19, 2017, 34 pages.

Non-Final Office Action for U.S. Appl. No. 15/219,268, dated Jun. 13, 2017, 20 pages.

Non-Final Office Action for U.S. Appl. No. 17/075,639, dated Aug. 3, 2022, 31 Pages.

Non-Final Office Action for U.S. Appl. No. 17/075,639, dated Jul. 10, 2023, 32 pages.

Notice of Allowance for U.S. Appl. No. 15/985,639, dated Nov. 29, 2023, 10 pages.

Notice of Allowance for U.S. Appl. No. 16/190,056, dated Apr. 13, 2022, 8 pages.

Office Action for Chinese Application No. 201680055868.9, dated May 13, 2021, 16 pages.

Supplementary European Search Report for European Patent Application No. 16831218.9, dated Jan. 31, 2019, 9 Pages.

Supplementary European Search Report for European Patent Application No. 16831220.5, dated Apr. 18, 2019, 15 Pages.

Supplementary European Search Report for European Patent Application No. 16831221.3, dated Feb. 12, 2019, 9 Pages.

Supplementary European Search Report for European Patent Application No. 16831222.1, dated Feb. 11, 2019, 10 Pages.

Supplementary European Search Report in European Patent Application No. 17739108.3, dated Jul. 31, 2019, 10 Pages.

Tapad: "Measuring Cross-Device, The Methodology", whitepaper, 5 pages, Mar. 2017, available at https://www.tapad.com/resources/cross-device-the-methodology, (last accessed Jul. 26, 2017).

"The Device Graph", Tapad, Available at https://www.tapad.com/device-graph, last accessed Jul. 26, 2017, 7 Pages.

Tubemogul Inc., "Programmatic Advertising Software", TubeMogul Software, 8 pages, Jul. 15, 2016, available from https://www.tubemogul.com/tubemogul-software/ (last accessed Jul. 26, 2017).

U.S. Appl. No. 16/782,006, filed Feb. 4, 2020, titled "Cross-Screen Measurement Accuracy in Advertising Performance", 61 Pages.

Notice of Allowance for U.S. Appl. No. 15/985,639, dated Apr. 5, 2024, 8 pages.

Notice of Allowance for U.S. Appl. No. 17/075,639, dated Jan. 18, 2024, 9 pages.

Notice of Allowance for U.S. Appl. No. 17/075,639, dated Mar. 29, 2024, 10 pages.

Notice of Allowance for U.S. Appl. No. 17/938,033, dated Nov. 17, 2023, 8 pages.

Notice of Allowance for U.S. Appl. No. 17/938,033, dated Mar. 20, 2024, 8 pages.

* cited by examiner

CROSS-SCREEN MEASUREMENT ACCURACY IN ADVERTISING PERFORMANCE

CLAIM OF PRIORITY

This application is a continuation of U.S. application Ser. No. 15/219,268, filed Jul. 25, 2016, which claims the benefit of priority under 35 U.S.C. § 119(e) of provisional application Ser. No. 62/264,764, filed Dec. 8, 2015, and provisional application Ser. No. 62/196,898, filed Jul. 24, 2015, each of which are incorporated herein by reference in their entireties.

RELATED APPLICATIONS

This application is related to U.S. patent application Ser. No. 15/219,259, filed Jul. 25, 2016, entitled "TARGETING TV ADVERTISING SLOTS BASED ON CONSUMER ONLINE BEHAVIOR", Ser. No. 15/219,262, filed Jul. 25, 2016, entitled "CROSS-SCREEN OPTIMIZATION OF ADVERTISING PLACEMENT", Ser. No. 15/219,264, filed Jul. 25, 2016, entitled "SEQUENTIAL DELIVERY OF ADVERTISING CONTENT ACROSS MEDIA DEVICES", and to provisional application Ser. Nos. 62/196,637, filed Jul. 24, 2015, 62/196,618, filed Jul. 24, 2015, 62/196,592, filed Jul. 24, 2015, 62/196,560, filed Jul. 24, 2015, 62/264,764, filed Dec. 8, 2015, 62/278,888, filed Jan. 14, 2016, 62/290,387, filed Feb. 2, 2016, and 62/317,440, filed Apr. 2, 2016, all of which are incorporated herein by reference in their entireties.

TECHNICAL FIELD

The technology described herein generally relates to statistical methods for cross-screen intelligence as it relates to advertising. The statistical methods enable advertisers and advertising agencies to predict the behaviors of consumers based on their aggregated cross-screen behavior. The methods integrate consumer data from a variety of media-enabled devices.

BACKGROUND

Today, predicting the behavior of consumers with available statistical methods is ineffective. This is in part because, siloed, device-specific approaches are currently being utilized by advertisers and advertising agencies. These methods limit the information available at the individual consumer level for lack of an ability to track how consumers behave across all of their media devices. For example, advertisers receive data from TV panel companies such as Nielsen, and use the information to decide how they are going to design and implement an advertising campaign. Panel companies utilize a small group of (usually 15,000-20,000) people selected statistically to be representative of the population, and use statistical extrapolation from viewing data on the panel to make deductions about the population at large. Alternatively, the advertisers will receive data from online panels such as Comscore, Nielsen, and Kantar, which track where the audience is online. Cable TV operators sell their own viewership data from their subscribers. The advent of online technology has meant that it is possible to directly collect data on large numbers of consumers, with the potential to achieve to more accurate assessment of population viewing habits. Nevertheless, it has not been possible so far to design a single advertising campaign that addresses all of the different types of media at once because of the silo'ed nature of the data, and interface points to the various media conduits.

Thus, a direct, automated, aggregate view of consumer behavior does not currently exist today. Instead, advertisers and brand managers look at each data source separately. Human analysts guide the selection of advertising inventory based on, for example, Excel data tables and other static data management tools. This results in low selection efficiency and delays in responding to market trends. Consumers are not disparate silos of preference, yet the market for advertising treats them as such due to limitations in the available methods, most of which are incapable of quickly and accurately integrating information about how consumers behave across all of their devices.

Strategy for TV is planned according to TV-specific criteria, and web and mobile advertising, which include sub-categories such as social media, are each planned separately. It is difficult to accurately predict consumer behavior, when data about their behavior is fragmented due to their multi-screen usage. Furthermore, consumers now have a large range of possible behaviors. One consumer might favor using a set top box to watch sports, but may prefer using a mobile device to watch YouTube. Another consumer may favor Hulu access via their desktop computer, but only accesses social media via their smart phone. There is no practical method for normalizing a complete view of consumer data to predict how and when they will access certain media devices throughout the day.

These complications have ramifications for advertisers in their efforts to both design effective campaigns and assess—quantitatively—the effectiveness of an ongoing campaign effort. The problem is especially acute for branding purposes, when it's more difficult for an advertiser to be confident that the right target audience saw a particular advertisement, or that the advertisement reached as many people in the target audience as had been intended.

There are other aspects that advertisers would like to know that cannot be reliably calculated today. For example, it is not possible to tell from Nielsen data whether the same consumer saw an advertisement on both TV and mobile. A panel company has to extrapolate and can only imperfectly estimate an answer to this question, if at all. Furthermore, panel companies simply report data and trends in data, but typically hold back from making a recommendation to an advertiser to tailor or target its advertising content differently.

The discussion of the background herein is included to explain the context of the technology. This is not to be taken as an admission that any of the material referred to was published, known, or part of the common general knowledge as at the priority date of any of the claims found appended hereto.

Throughout the description and claims of the application the word "comprise" and variations thereof, such as "comprising" and "comprises", is not intended to exclude other additives, components, integers or steps.

SUMMARY

The instant disclosure addresses the processing of consumer and advertising inventory in connection with assessing optimal placement of advertising content across display devices. In particular, the disclosure comprises methods for doing the same, carried out by a computer or network of computers. The disclosure further comprises a computing apparatus for performing the methods, and computer readable media having instructions for the same. The apparatus and process of the present disclosure are particularly applicable to video content in online and TV media.

The methods herein can be achieved in part by detecting whether a consumer saw the same advertisement on more than one device, i.e., getting a measure of deduplicated reach. The system herein can retrieve data from lots of sources, and can do a better job of extrapolation to other consumers and to other media for the same consumers because it can work with attributes from a population of users. Thus, the system can extrapolate based on census data, segments, etc., based on consumer and device graph properties.

Accordingly, basic quantities such as GRP and TRP (currently estimated by panel companies such as Nielsen) can be calculated more reliably. It is also possible to go beyond those basic parameters, and obtain additional types of information, which can be used in refinements of an advertising strategy.

For example, if it can be calculated how many times the same consumer has seen an advertisement, then an advertiser can adjust parameters of its campaign so that at the next iteration of the campaign, it is more effective at eliminating redundancy in the message. Parameters that can be changed include, but are not limited to: demographics of the audience members; inventory (TV spot, online website); time of day, region, and network. For example, it might be deduced from measurement that, e.g., a particular channel is not effective. The measurements can also be used to ensure frequency capping.

The system can calculate one or more of: optimized consumer segments (i.e., a segment of consumers that performs better, according to, for example, branding or direct response; classifications; and improved measurement and prediction of future consumer behaviors based on the processed data on cross-screen behavior.

The present disclosure provides for a method for quantifying efficacy of an advertising campaign, comprising: identifying a target audience based on one or more demographic factors; for a consumer in the target audience, identifying two or more display devices accessible to the consumer, wherein the two or more display devices comprise at least one TV and at least one mobile device, and wherein the identifying utilizes a device graph constructed from an aggregation of TV viewing data and online behavioral data for the consumer; monitoring delivery of two or more items of advertising content to the consumers in the target audience, wherein the two or more items of advertising content comprise video content and are scheduled for delivery on the two or more devices; receiving a confirmation of whether each of the consumers viewed each of the first and second items of advertising content; and utilizing the confirmation in calculation of a deduplicated reach for the advertising campaign.

The present disclosure further provides for a method of reducing redundancy of delivery of advertising content, comprising: identifying a target audience based on one or more demographic factors, wherein the target audience comprises consumers to whom an advertising campaign is directed; for a consumer in the target audience, identifying two or more display devices accessible to the consumer, wherein the two or more display devices comprise at least one TV and at least one mobile device, and wherein the identifying utilizes a device graph constructed from an aggregation of TV viewing data and online behavioral data for the consumer; monitoring delivery of two or more items of advertising content to the consumers in the target audience, wherein the two or more items of advertising content comprise video content and are scheduled for delivery on the two or more devices; receiving a confirmation of whether each of the consumers viewed each of the first and second items of advertising content; and if a consumer viewed both the first and second items of advertising content, adjusting one or more parameters of the advertising campaign, in order to reduce redundancy of delivery of advertising content to one or more of the consumers during subsequent trials of the campaign, wherein the parameters are selected from one or more of: demographic factors of the target audience; sources of advertising inventory; time of day of delivery; and region of delivery.

The present disclosure further includes a process for computer readable media, encoded with instructions for carrying out methods described herein and for processing by one or more suitably configured computer processors.

The present disclosure additionally includes a computing apparatus configured to execute instructions, such as stored on a computer readable medium, for carrying out methods described herein.

BRIEF DESCRIPTION OF THE DRAWINGS

Like reference symbols in the various drawings indicate like elements.

DETAILED DESCRIPTION

The instant technology is directed to measurement of aspects of efficacy of a cross-screen advertising campaign. Cross-screen refers to media device data that combines viewer data across multiple devices.

Types of Available Data and Resources

Data for use with the methods herein comes from a number of disparate sources, some of which directly from the consumer, and some itself based on models.

TV Panels: Panelists are paid for providing information. Panels are metered via remote while viewers watch content. Other information can be surveyed regarding products purchased, owned, preferences, etc., (Nielsen/Kantar are examples). Nevertheless, despite attempts to make panels representative of the population at large, most census measurements are specific to the panel and/or the media outlet in question.

Online panels are managed by systems that track where an audience is online and how consumers behave online. Panelists generally agree to be tracked via a browser-based system with tool bar. Products use cookies and pixels to track clicks, time spent on websites, sites visited, and online purchases. (Comscore, Nielsen, and Kantar are examples of companies that collect this type of data and analyze it.)

Cable operators provide TV viewing data, sometimes called meta-data, to Set Top Box data collectors: this allows use of data measured on actual viewing by subscribers to cable and satellite systems. The cable operators sell this data to advertisers to assist with targeted advertising campaigns.

Data can also be licensed directly from the cable operators or TV OEMs (such as Samsung, LG, etc.). The TV's have reporting chips that can report back viewing data via the Internet to subscribers of that data, such as Rentrak, Fourthwall, and Samba.

Advertising Functions

Figure 1:
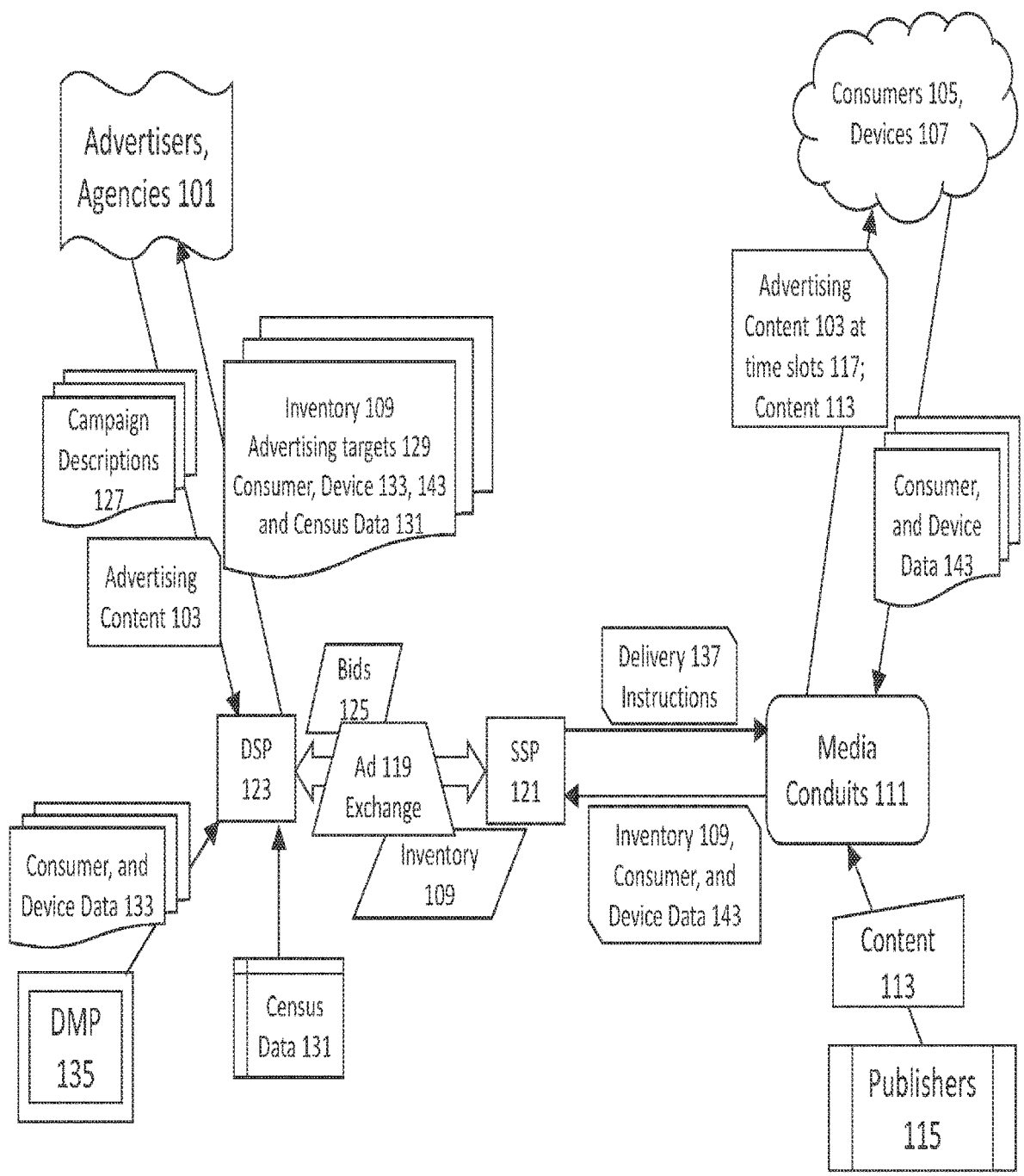
FIG. 1 shows, diagrammatically, relationships between parties that contribute to delivery of advertising content, such as advertisers, an advertising exchange, media conduits, and consumers.

Relationships between entities in the business of purchase, delivery and consumption of advertising content are depicted in FIG. 1. As can be seen, the advertising ecosystem is complex, involves many different entities, and many different relationships.

An advertiser 101 is a purchaser of advertising inventory 109. An advertiser may be a corporation that exercises direct control over its advertising functions, or it may be an agency that manages advertising requirements of one or more clients, usually corporate entities. The advertiser intends to make advertising content 103 (also an "advertisement" herein) available to one or more, typically a population of, consumers 105, on one or more devices 107 per consumer.

Devices 107 include, for a given consumer, one or more of: TV's (including SmartTV's), mobile devices (cell phones, smartphones, media players, tablets, notebook computers, laptop computers, and wearables), desktop computers, networked photo frames, set top boxes, gaming consoles, streaming devices, and devices considered to function within the "Internet of Things" such as domestic appliances (fridges, etc.), and other networked in-home monitoring devices such as thermostats and alarm systems.

The advertising content 103 has typically been created by the advertiser 101 or a third party with whom the advertiser has contracted, and normally includes video, audio, and/or still images that seek to promote sales or consumer awareness of a particular product or service. Advertising content 103 is typically delivered to consumers via one or more intermediary parties, as further described herein.

Advertising content is typically of two different types: branding, and direct-response marketing. The timeframe is different for these two types. Branding promotes awareness; direct response marketing is designed to generate an immediate response. For example, an automobile manufacturer may put out direct response marketing material into the market place, and wants to measure responses by who went to a dealership or website after seeing an advertisement. The methods herein can be applied to both types of advertising content, but the measurement of effectiveness is different for the two types: for example, effectiveness of branding is measured by GRP's, and results of direct response marketing can be measured by, for example, website visits.

When delivered to a mobile device such as a phone or a tablet, advertising content 103 may additionally or alternatively take the form of a text/SMS message, an email, or a notification such as an alert, a banner, or a badge. When delivered to a desktop computer or a laptop computer or a tablet, the advertising content 103 may display as a pop-up within an app or a browser window, or may be a video designed to be played while other requested video content is downloading or buffering.

Consumers 105 are viewers and potential viewers of the advertising content 103 and may have previously purchased the product or service that is being advertised, and may—advantageously to the advertiser—be learning of the product or service for the first time when they view the advertising content 103.

Advertising inventory 109 (also inventory or available inventory, herein) comprises available slots, or time slots 117, for advertising across the several media interfaces, or conduits 111, through which consumers access information and advertising content. Such media interfaces include TV, radio, social media (for example, online networks, such as LinkedIn, Twitter, Facebook), digital bill boards, mobile apps, and the like. Media conduits 111 may generate their own content 113, or may be broadcasting content from one or more other content providers or publishers 115. For example, a cable company is a media conduit that delivers content from numerous TV channel producers and publishers of content. Media interfaces may also be referred to as content providers, generally, because they deliver media content 113 (TV programs, movies, etc.) to consumers 105. One aspect of the technology herein includes the ability to aggregate inventory 109 from more than one type of media interface or content provider. Media conduits 111 also deliver advertising content 103 that has been purchased for delivery at time slots 117, to consumers 105 for viewing on various devices 107. A publisher 115 is typically a content owner (e.g., BBC, ESPN).

A slot 117 is a time, typically expressed as a window of time (1 minute, 2 minutes, etc.) at a particular time of day (noon, 4:30 pm, etc., or a window such as 2-4 pm, or 9 pm-12 am), or during a specified broadcast such as a TV program, on a particular broadcast channel (such as a TV station, or a social media feed). An available slot is a slot in the inventory that an advertiser may purchase for the purpose of delivering advertising content. Typically it is available because another advertiser has not yet purchased it. As further described herein, a slot may additionally be defined by certain constraints such as whether a particular type of advertising content 103 can be delivered in a particular slot. For example, a sports equipment manufacturer may have purchased a particular slot, defined by a particular time of day on a particular channel, and may have also purchased the right to exclude other sports equipment manufacturers from purchasing slots on the same channel within a certain boundary—in time—of the first manufacturer's slot.

In this context, a "hard constraint" is a legal or otherwise mandatory limitation on placing advertising in particular time slots or within specified media. A "soft constraint" refers to desired (non-mandatory) limitations on placing advertising in particular time slots within specified media. "Constraint satisfaction" refers to the process of finding a solution to a set of constraints that impose conditions that the variables must satisfy. The solution therefore is a set of values for the variables that satisfies all constraints.

Information is intended to mean, broadly, any content that a consumer can view, read, listen to, or any combination of the same, and which is made available on a screen such as a TV screen, computer screen, or display of a mobile device such as a tablet, smart-phone, or laptop/notebook computer, a wearable such as a smart-watch, fitness monitor, or an in-car or in-plane display screen. Information is provided by a media interface 111 such as a TV or radio station, a multi-channel video programming distributor (MVPD, such as a cable TV provider, e.g., Comcast), or an online network such as Yahoo! or Facebook.

VOD refers to video on demand systems, which allow users to select and watch or listen to video or audio content when they choose to, rather than having to watch content at a scheduled broadcast time. Internet technology is often used to bring video on demand to televisions and personal computers. Television VOD systems can either stream content through a set-top box, a computer or other device, allowing viewing in real time, or download it to a device such as a computer, digital video recorder (also called a personal video recorder) or portable media player for viewing at any time.

The communication between the advertisers and the media conduits can be managed by up to several entities, including: a demand-side provider (DSP) 123, an advertising exchange 119, and a supply-side provider 121. An advertising exchange 119 (also, exchange herein) is an environment in which advertisers can bid on available media inventory. The inventory may be digital such as via online delivery over the Internet, or via digital radio such as SiriusXM, or may be analog, such as via a TV channel such as ESPN, CNN, Fox, or BBC, or an FM/AM radio broadcast. An advertising exchange 119 typically specializes in certain kinds of content. For example, SpotX specializes in digital content, WideOrbit specializes in programmatic TV.

Supply-side provider (SSP) 121 is an intermediary that takes inventory 109 from a media conduit 111, and makes it available to a demand-side provider (DSP) 123, optionally via exchange 119, so that advertisers can purchase or bid on the inventory when deciding how to position advertising content 103. In some situations, an SSP interacts directly with a DSP without the need for an advertising exchange; this is true if the functions of an advertising exchange that a purchaser of advertising content relies on are performed by one or both of the DSP and SSP. The technology herein is particularly suited for being implemented and being carried out by a suitably-configured DSP.

In one configuration, an advertising exchange 119 interfaces between a supply side provider (SSP) 121 and a demand side provider (DSP) 123. The interfacing role comprises receiving inventory 109 from one or more SSP's 121 and making it available to the DSP, then receiving bids 125 on that inventory from the DSP and providing those bids 125 to the SSP. Thus, a DSP makes it possible for an advertiser to bid on inventory provided by a particular SSP such as SpotX, or WideOrbit. In some configurations, the DSP takes on most or all of the role of an advertising exchange.

In one embodiment of the technology herein, a DSP provides a schedule for an advertising campaign, which, if approved by the advertiser, the DSP has to purchase on its behalf and arrange for the execution of the campaign. The SSP controls delivery of the advertising content to the media conduits.

An advertising campaign (or campaign) is a plan, by an advertiser, to deliver advertising content to a particular population of consumers. A campaign will typically include a selection of advertising content (such as a particular advertisement or various forms of an advertisement, or a sequence of related advertisements intended to be viewed in a particular order), as well as a period of time for which the campaign is to run (such as 1 week, 1 month, 3 months). An advertiser typically transmits a campaign description 127 to an advertising exchange 119 or a DSP 121, and in return receives a list of the inventory 109 available. A campaign description 127 may comprise a single item of advertising content 103 and one or more categories of device 107 to target, or may comprise a schedule for sequential delivery of two or more items of advertising content 103 across one or more devices 107. A campaign description 127 may also comprise a description of a target audience, wherein the target audience is defined by one or more demographic factors selected from, but not limited to: age range, gender, income, and location.

The DSP 123 then provides an interface by which the advertiser 101 can align its campaign descriptions 127 against inventory 109 and purchase, or bid on, various slots 117 in the inventory. The DSP 123, or an exchange 119, may be able to provide more than one set of inventory that matches a given campaign description 127: each set of inventory that matches a given campaign description is referred to herein as an advertising target 129. The advertiser 101 may select from among a list of advertising targets, the target or targets that it wishes to purchase. Once it has purchased a particular target, the SSP 121 is notified and delivery instructions 137 are sent to the various media conduits 111 so that the advertising content 103 can be delivered in the applicable time slots 117, or during selected content 113, to the relevant consumers.

A purchase of a given slot is not simply a straightforward sale at a given price, but is achieved via a bidding process. The DSP will place bids on a number of slots, and for each one, will have identified a bid price that is submitted to the SSP. For a winning bid, the SSP delivers the advertising content to the media conduit, and ultimately the consumer. Bids are generally higher for specific targeting than for blanket targeting.

The bidding process depends in part on the type of advertising content. TV content can be scheduled in advance, whereas for online content, the typical bid structure is lust-in-time' bidding: the advert is delivered only if a particular consumer is seen online. In general, the methods herein are independent of bidding process, and are applicable to any of the bidding methods typically deployed, including real-time-bidding, as well as bidding that exploits details of programmatic TV data. Where real-time bidding (RTB) is used, it may, e.g., be utilizing protocol RTB 2.0-2.4, see Internet Advertisers Bureau at www.iab.com/quidelines/real-time-bidding-rtb-project/).

By serving a tag with a given online ad, by using a protocol such as VPAID (https://en.wikipedia.org/wiki/Mixpo) or VAST (video advert serving template), the tag collects data including whether a consumer clicked on, or viewed, the content. The tag typically contains a number of items of data relating to how a consumer interacted with the advertising content. The items of data can be returned to the SSP and/or the DSP in order to provide feedback on the circumstances of delivery of the advertisement. For example, the items of data can include a datum relating to whether a user clicked on a video online. Certain items of data correspond to events that are referred to in the industry as "beacon" events because of their salience to an advertiser: for example a beacon event can include the fact that a user stopped a video segment before it completed.

The process of generating advertising targets may also depend one or more campaign requirements. A campaign requirement, as used herein, refers to financial constraints such as a budget, and performance specifications such as a number of consumers to target, set by an advertiser or other purchaser of advertising inventory. Campaign requirement information is used along with campaign descriptions when purchasing or bidding on inventory.

DSP's 123 also provide advertisers 101 with data on consumers and devices, aggregated from various sources. This data helps an advertiser choose from the inventory, those time slots and media conduits that will best suit its goals.

Data used by DSP's may include census data 131, or data on specific consumers and devices 133. Census data 131 includes data on a population that can be used to optimize purchase of inventory. Census data 131 can therefore include demographic data such as age distribution, income variations, and marital status, among a population in a particular viewing region independent of what media interfaces the members of the population actually view. Census data 131 can be aggregated from a variety of sources, such as state and county records, and U.S. Census Bureau data.

A data management platform (DMP) 135 can provide other types of third party data 133 regarding consumers and the devices they use to the DSP. Examples of DMP's include: Krux, Exelate, Nielsen, Lotame. The consumer and device data 133 that is delivered to a DSP from a third party provider may complement other consumer and device data 143 that is provided by the media conduits. Data on consumers and the devices they use that is relevant to an advertiser includes matters of viewing habits as well as specific behavioral data that can be retrieved directly from a media conduit. For example, as further discussed elsewhere herein, when a media conduit serves an advertisement to a consumer, the conduit can collect information on that user's manner of access to the advert. Due to the volume of data involved, after a relatively short period of time, such as 14 days, a media conduit may not be able to furnish any information on a particular consumer. In that instance, the DSP can get data on that user from a third party such as a DMP. Third parties can get data offline as well. As used herein, an offline event is one that happens independently of the Internet or a TV view: for example, it can include purchase of an item from a store and other types of location-based events that an advertiser can view as significant. Data can be shared between the entities herein (e.g., between a DMP and a DSP, and between DSP and SSP, and between media conduits and a SSP or advertising exchange) using any commonly accepted file formats for sharing and transfer of data: these formats include, but are not limited to: JSON, CSV, and Thrift, as well as any manner of text file appropriately formatted.

An impression refers to any instance in which an advertisement reaches a consumer. On a TV, it is assumed that if the TV is broadcasting the advertisement then an individual known to be the owner of, or a regular viewer of, that TV will have been exposed to the advertisement, and that display counts as an impression. If multiple persons are in the same household then the number of impressions may equal the number of persons who can view that TV. In the online environment, an impression occurs if a consumer is viewing, say, a web-page and the advertisement is displayed on that web-page such as in the form of a pop-up, or if the user has clicked on a link which causes the advertisement to run.

An audience segment is a list of consumers, de-identified from their personally identifiable information using cookie syncing or other methods, where the consumers belong to a type (income, gender, geographic location, etc.), or are associated with a behavior: purchases, TV viewership, site visits, etc.

Cookie syncing refers to a process that allows data exchange between DMP's SSP's and DSP's, and more generally between publishers of content and advertisement buyers. A cookie is a file that a mobile device or desktop computer uses to retain and restore information about a particular user or device. The information in a cookie is typically protected so that only an entity that created the cookie can subsequently retrieve the information from it. Cookie syncing is a way in which one entity can obtain information about a consumer from the cookie created by another entity, without necessarily obtaining the exact identify of the consumer. Thus, given information about a particular consumer received from a media conduit, through cookie syncing it is possible to add further information about that consumer from a DMP.

For mobile devices, there is a device ID, unique to a particular device. For TV's there is a hashed IP address. The device ID information may be used to link a group f devices to a particular consumer, as well as link a number of consumers, for example in a given household, to a particular device. A DSP may gather a store of data, built up over time, in conjunction with mobile device ID's and TV addresses, that augment 'cookie' data.

Cross-screen refers to distribution of media data, including advertising content, across multiple devices of a given consumer, such as a TV screen, computer screen, or display of a mobile device such as a tablet, smart-phone or laptop/notebook computer, a wearable such as a smart-watch or fitness monitor, or an in-car, or in-plane display screen, or a display on a networked domestic appliance such as a refrigerator.

Reach is the total number of different people exposed to an advertisement, at least once, during a given period.

In a cross-screen advertising or media campaign, the same consumer can be exposed to an advertisement multiple times, through different devices (such as TV, desktop or mobile) that the consumer uses.

Deduplicated reach is the number of different people exposed to an advertisement irrespective of the device. For example, if a particular consumer has seen an advertisement on his/her TV, desktop and one or more mobile devices, that consumer only contributes 1 to the reach.

The incremental reach is the additional deduplicated reach for a campaign, over and above the reach achieved before starting, such as from a prior campaign. In one embodiment herein, a type of campaign can include a TV extension: in this circumstance, an advertiser has already run a campaign on TV, but is reaching a point of diminished returns. The advertiser wants to find ways to modify the campaign plan for a digital market, in order to increase the reach. In this way, a DSP may inherit a campaign that has already run its course on one or more media conduits.

In addition to TV programming content, and online content delivered to desktop computers and mobile devices, advertisements may be delivered within OTT content. OTT (which derives from the term "over the top") refers to the delivery of audio, and video, over the Internet without the involvement of a MVPD in the control or distribution of the content. Thus, OTT content is anything not tied to particular box or device. For example, Netflix, or HBO-Go, deliver OTT content because a consumer doesn't need a specific device to view the content. By contrast, MVPD content such as delivered to a cable or set top box is controlled by a cable or satellite provider such as Comcast, AT&T or DirecTV, and is not described as OTT. OTT in particular refers to content that arrives from a third party, such as Sling TV, YuppTV, Amazon Instant Video, Mobibase, Dramatize, Presto, DramaFever, Crackle, HBO, Hulu, myTV, Netflix, Now TV, Qello, RPI TV, Viewster, WhereverTV, Crunchyroll or WWWE Network, and is delivered to an end-user device, leaving the Internet service provider (ISP) with only the role of transporting IP packets.

Furthermore, an OTT device is any device that is connected to the internet and that can access a multitude of content. For example, Xbox, Roku, Tivo, Hulu (and other devices that can run on top of cable), a desktop computer, and a smart TV, are examples of OTT devices.

Gross rating point (GRP) refers to the size of an advertising campaign according to schedule and media conduits involved, and is given by the number of impressions per member of the target audience, expressed as a percentage (GRP can therefore be a number>100. For example, if an advert reaches 30% of the population of L.A. 4 times, the GRP is 120. (The data may be measured by, e.g., a Nielsen panel of say 1,000 viewers in L.A.).

The target rating point (TRP) refers to the number of impressions per target audience member, based on a sample population. This number relates to individuals: e.g., within L.A. the advertiser wants to target males, 25 and older. If there are 100 such persons in the L.A. panel and 70% saw the ad, then the TRP is 70% X number of views.

Real-time refers to real-time computing, and is defined as a computing system that can receive and process data, and return analyzed results sufficiently rapidly (such as within a matter of seconds) that it effectively does not cause delay to a party who relies upon the results for decision-making purposes. It is to be assumed that the processes for allowing an advertiser to select, bid on, and purchase advertising inventory, as described herein, can be carried out in real-time.

"Device Graph" refers to the association of users with devices on which they consume media.

Consumer Data

Data about consumers can be categorized into two groups: there are non-transmutable characteristics such as ethnicity, and gender; and there are transmutable characteristics such as age, profession, address, marital status, income, taste and preferences. Various transmutable characteristics such as profession are subject to change at any time, while others such as age change at a consistence rate. Today, the data systems that track consumer information for use in targeting advertising content lack the ability to broadly track both categories of consumer data. Most data systems contain static, homogenous classifications of consumers. For example, a 29-year old who bought a car two years ago will be a consumer data point that will not be updated or augmented with time. Even if the age of the individual as stored in a system can be adjusted with time, other transmutable characteristics such as change in marital state, or lifestyle changes, are not taken into account in this consumer's classification.

At various stages of the methods herein, it is described that each consumer in a population of consumers is treated in a particular way by the method: for example, a computer may be programmed to analyze data on each consumer in its database in order to ascertain which, if any, have viewed a particular TV show, or visited a particular website; alternatively, some comparative analysis may be performed, in which attributes of each user in one category of population are compared with attributes of each consumer in another category of population. Each population set may comprise many thousands of individuals, or many hundreds of thousands, or even millions or many millions of individuals. It is assumed herein that the methods, when deployed on suitable computing resources, are capable of carrying out stated calculations and manipulations on each and every member of the populations in question. However, it is also consistent with the methods herein that "each consumer" in a population may also mean most consumers in the population, or all consumers in the population for whom the stated calculation is feasible. For example, where one or more given consumers in a population is omitted from a particular calculation because there is insufficient data on the individual, that does not mean that an insufficient number of members of the population is analyzed in order to provide a meaningful outcome of the calculation. Thus "each" when referencing a population of potentially millions of consumers does not necessarily mean exactly every member of the population but may mean a large and practically reasonable number of members of the population, which for the purposes of a given calculation is sufficient to produce a result.

The methods herein can include performing corrections or normalizations of other consumer data based on census data, if, for example, there is a mismatch for the demographic data from census and that from other sources. This might occur if the majority of consumer data from an area reflects incomes of relatively high income, yet the area as a whole is impoverished, with only pockets of wealth.

Consumer Graph

A consumer graph is a graph in which each node represents a consumer (or individual user). The technology utilizes various implementations of a weighted graph representation in which relationships between consumers (nodes) are defined as degrees of similarity (edges). A consumer graph is used herein to categorize, store, and aggregate large amounts of consumer data, and allow an entity such as a DSP to make connections between data used to build a consumer graph with other data—such as TV viewing data—via data on given consumers' devices.

One way to construct the graph is by using deterministic relationship data; another is probabilistically using the attributes of each node. In some instances, a combination of deterministic and probabilistic methods can be used. In a deterministic, approach, which is relatively straightforward, the basis is having exact data on a consumer, such as login information from a publisher. Thus, if a person has logged in multiple times on different devices with the same ID, then it is possible to be sure that the person's identity is matched. However, such exact information may not always be available. By contrast, in a probabilistic approach, it is necessary to draw inferences: for example, if the same device is seen in the same location, or similar behavior can be attributed to a given device at different times, then it possible to conclude that the device belongs to the same user.

In some embodiments herein, machine learning methods, and Bayesian and regression algorithms, are used to explore commonalities between consumers. Such methods are useful in situations where there is a finite number of parameters to be considered. In some other embodiments, techniques of deep learning are more useful in finding consumer similarities and constructing a consumer graph. Machine learning is a preferred technique for matching exact pieces of information, for example whether the same websites have been visited by two consumers, but deep learning can explore the details of a particular video or TV program—for example, by analyzing natural scene statistics—and thereby ascertain, for example, whether two adverts that were viewed by a given consumer have something in common beyond their subject matter. For example, two adverts may include the same actor and be liked by a consumer for that reason, even though the products portrayed have little in common.

In preferred embodiments, the device graph herein is based on probabilistic data. The probabilistic approach to graph construction uses behavioral data such as viewership habits to match up users.

In some embodiments an entity, such as a DSP, can construct a device graph; in other embodiments it can obtain, such as purchase, it from another entity such as a DMP.

In various embodiments herein, both a device graph and a consumer graph are operating together in a manner that permits tying in mobile data to TV data.

Figure 2:
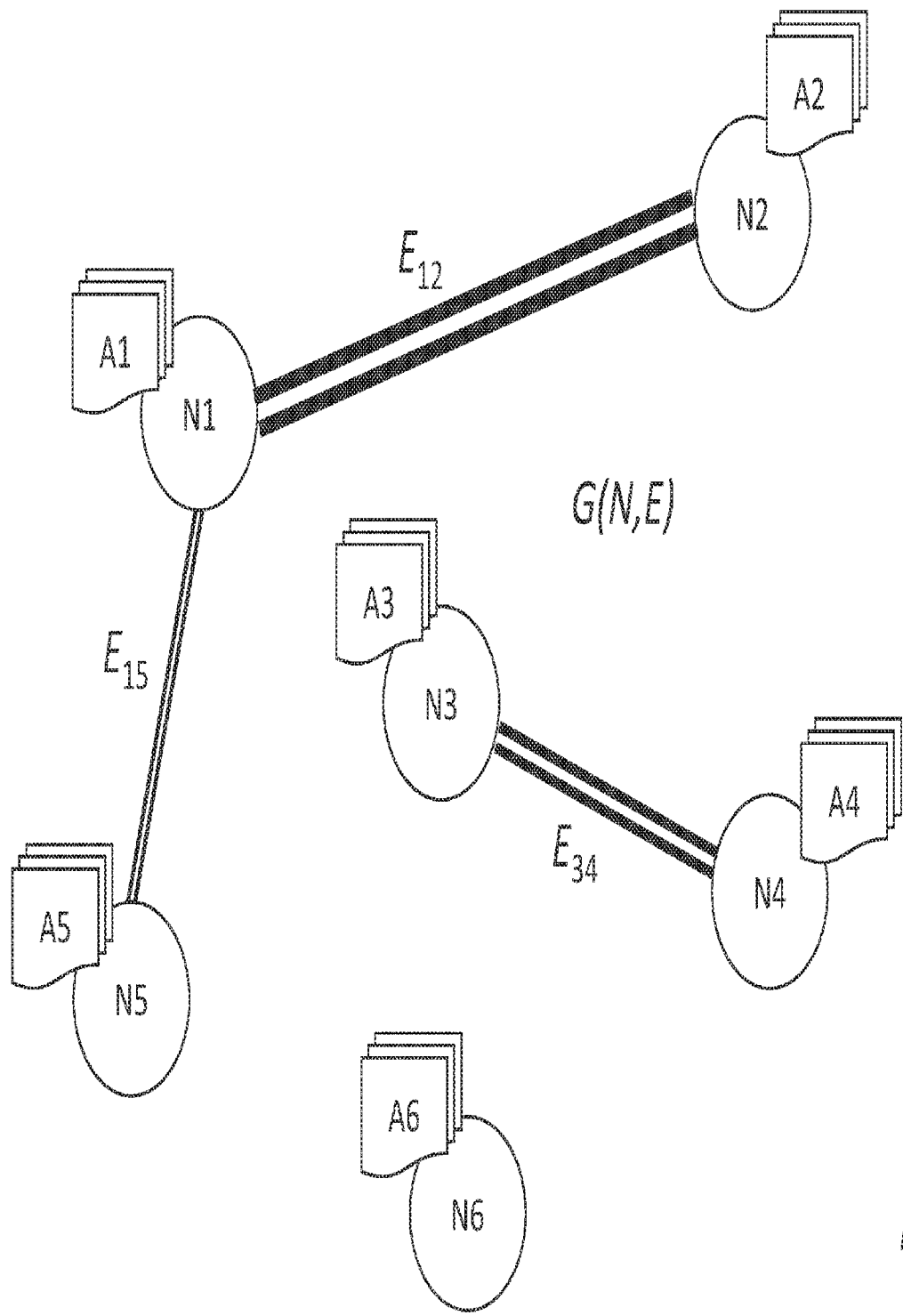
FIG. 2 shows a consumer graph.

The term graph is used herein in its mathematical sense, as a set G(N, E) of nodes (N) and edges (E) connecting pairs of nodes. Graph G is a representation of the relationships between the nodes: two nodes that are connected by an edge are similar to one another according to some criterion, and the weight of an edge defines the strength of the similarity. Pairs of nodes that do not meet the similarity criterion are not joined by an edge. FIG. 2 illustrates graph concepts, showing 6 nodes, $N_1$-$N_6$, in which three pairs of nodes are connected by edges.

In the implementation of a graph herein, a node, N, is an entity or object with a collection of attributes, A. In FIG. 2, each node has associated with it an array of attributes, denoted Ai for node Ni.

In the implementation of a graph herein, an edge, E, existing between two nodes indicates the existence of a relationship, or level of similarity, between the two nodes that is above a defined threshold. The weight of an edge, w_E, is the degree of similarity of the two nodes. The weights of the edges in FIG. 2 are shown diagrammatically as thicknesses (in which case, $w\_E_{12} > w\_E_{34} > w\_E_{15}$).

In a consumer graph, a node represents an individual, or a household comprising two or more individuals, with a set of attributes such as the gender(s) and age(s) of the individual(s), history of TV programs watched, web-sites visited, etc.

Figure 3:
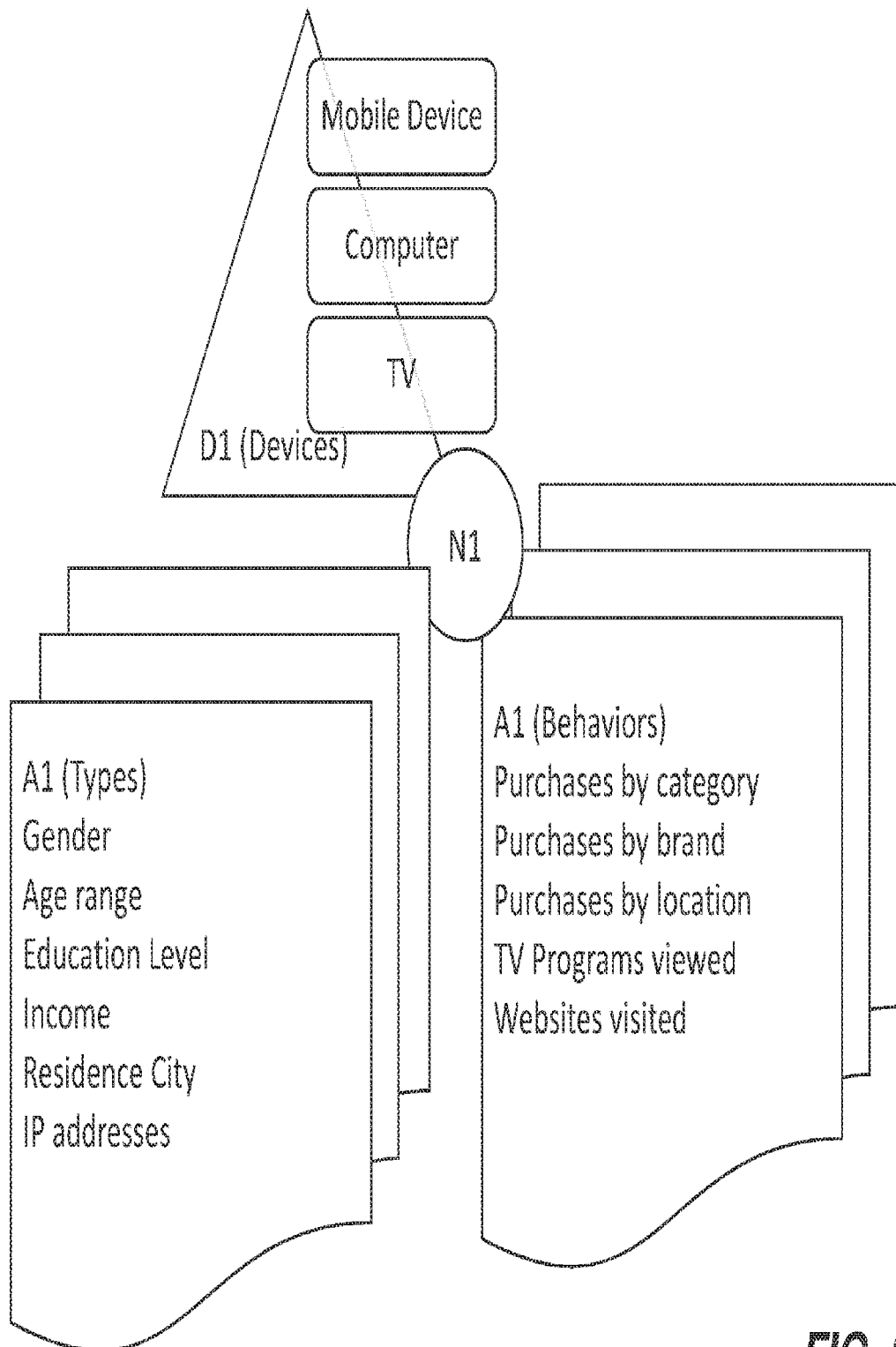
FIG. 3 shows a node in a graph.

FIG. 3 illustrates an exemplary structure of a node of a consumer graph. Each node has a collection of attributes that include types and behaviors, for which data is continuously collected from first party and third party sources. Many of the attributes are transmutable if new information for the consumer becomes available, and the collection of attributes (i.e., the number of different attributes stored for a given consumer) can also grow over time as new data is collected about the consumer. An aspect of the technology herein is that the graph is constructed from a potentially unlimited number of inputs for a given consumer, such as online, offline, behavioral, and demographic data. Those inputs are updated over time and allow the data for a given consumer to be refined, as well as allow the population of consumers on which data can be used to be expanded. The fact that there is no limit to the type and character of data that can be employed means that the methods herein are superior to those employed by panel companies, which rely on static datasets and fixed populations.

Some of the sources from which data is collected are as follows.

Type data is categorical data about a consumer that normally does not change, i.e., is immutable. Behavioral data is continuously updated based on a consumer's recent activity.

Each node includes a grouping of one or more devices (desktop, mobile, tablets, smart TV). For each device, data on the type of the user based on the device is collected from third party and first party sources.

Table 1 shows examples of data by category and source.

TABLE 1

|  | $1^{st}$ party | $3^{rd}$ party |
|---|---|---|
| Non-transmutable |  | Census (Govt.) Household income Education Level (e.g. from Exelate) Gender (e.g. from Nielsen, DAR) |

TABLE 1-continued

|  | $1^{st}$ party | $3^{rd}$ party |
|---|---|---|
| Transmutable | Behavior (online) TV viewing Viewability (how much of advert seen, kept on, visible online?) Online sites visited Location events | Offline Behavior Retail Purchases Offsite visits (visited pharmacy, movie theater, car dealership, etc. |

First party data comprises data on a user's behavior, for example: purchases, viewership, site visits, etc., as well as types such as income, gender, provided directly by a publisher to improve targeting and reporting on their own campaigns. (For example, the Coca-Cola company might provide to a DSP, a list of users who "like" Coke products on social media to improve their video advertising campaigns.) First party type data can be collected from advertisements served directly to the device, and from information collected from the device, such as one or more IP addresses. First party type data includes location from IP address, geolocation from mobile devices, and whether the device is located in a commercial or residential property.

Third party type data is obtained from external vendors. Through a one-on-one cookie synchronization or a device synchronization, an external vendor, for example a DMP such as Krux (www.krux.com/), Experian (which provides purchase behavior data), or Adobe, provides information about the cookie or device. Example data includes market segment occupied by the consumer, such as age range, gender, income level, education level, political affiliation, and preferences such as which brands the consumer likes or follows on social media. Additionally, external vendors can provide type data based on recent purchases attributed to the device. Third party data includes information such as gender and income because it is not collected directly from external vendors. Third party data can be collected without serving an advertisement. TV programs viewed and purchases are third party data.

First Party data is typically generated by a DSP; for example, it is data that the DSP can collect from serving an Ad or a Brand/Agency that provides the data. First party data includes data that depends on having served an Ad to have access to it.

Behavioral data can be collected from the devices through first party and third party sources. Behaviors are first party data typically. Behaviors are mutable.

First party behavioral data is collected from advertisements served directly to the device. This includes websites visited, and the TV program, or OTT, or video on demand (VOD) content viewed by the device.

Third party behavioral data is obtained from external vendors, typically DMP's such as Experian, Krux, Adobe, Nielsen and Comscore, and advertising exchanges or networks, such as BrightRoll, SpotX, FreeWheel, Hulu. Example data includes the history of TV programming viewed on the device in the last month, the history of websites visited by a personal computer or laptop, or mobile device, and history of location based events from mobile devices (for example, whether the device was at a Starbucks). In some instances, the same types of data can be obtained from both first party and third party entities.

Edges between the nodes in the consumer graph signify that the consumers have a threshold similarity, or interact with each other. The edges can be calculated deterministically, for example, if the nodes are in physical proximity, or probabilistically based on similarity in attributes. Probabilistic methods utilized include, but are not limited to: K-means clustering, and connected components analysis (which is based on graph traversal methods involving constructing a path across the graph, from one vertex to another. Since the attributes are transmutable, the edges can also change, either in their weighting or by being created or abolished if the similarity score for a pair of nodes alters. Thus the graph is not static, and can change over time. In some embodiments, change is dynamic: similarity scores are continually recalculated as nodes attributes for nodes are updated.

Typically, attributes and data are added dynamically (as they are obtained). The graph may be re-constructed weekly to take account of the new attributes and data, thereby establishing new weightings for the edges, and identifying newly connected or reconnected devices. (Graph construction and reconstruction may be done in the cloud, or on a datacenter under the control of the DSP.)

The similarity, S, between two nodes $N\_1$, $N\_2$, is calculated according to a similarity metric, which is the inverse of a distance function, $f(N\_1, N\_2)$: $N\_1, N\_2 \rightarrow S$, that defines the similarity of two nodes based on their attributes.

In a consumer graph, similarity represents the likeness of two individuals in terms of their demographic attributes and their viewing preferences. Similarities can be calculated, attribute by attribute, and then the individual similarity attributes weighted and combined together to produce an overall similarity score for a pair of nodes.

When the attributes of two nodes are represented by binary vectors, there are a number of metrics that can be used to define a similarity between a pair of nodes based on that attribute. Any one of these metrics is suitable for use with the technology herein. In some embodiments, for efficiency of storage, a binary vector can be represented as a bit-string, or an array of bit-strings.

When working with a similarity metric that is the inverse of a distance function, $f(N\_i, N\_j)$, a zero value of the distance function signifies that the types and behaviors of the two nodes are identical. Conversely, a large value of the distance function signifies that the two nodes are dissimilar. An example of a distance function is Euclidean distance, $$f(N\_i, N\_j) = \|A\_i - A\_j\|^2$$

where $A\_i$, and $A\_j$ are the sparse vectors representing the attributes of nodes $N\_i$ and $N\_j$, and the distance is computed as a sum of the squares of the differences of in the values of corresponding components of each vector.

Comparisons of binary vectors or bit-strings can be accomplished according to one or more of several similarity metrics, of which the most popular is the Tanimoto coefficient. Other popular metrics include, but are not limited to: Cosine, Dice, Euclidean, Manhattan, city block, Euclidean, Hamming, and Tversky. Another distance metric that can be used is the LDA (latent Dirichlet allocation). Another way of defining a distance comparison is via a deep learning embedding, in which it is possible to learn the best form of the distance metric instead of fixing it as, e.g., the cosine distance. An example approach is via manifold learning.

The cosine dot product is a preferred metric that can be used to define a similarity between the two nodes in a consumer graph. The cosine similarity, that is the dot product of $A\_i$ and $A\_j$, is given by:

$$f(N\_i, N\_j) = A\_i \cdot A\_j$$

In this instance, the vectors are each normalized so that their magnitudes are 1.0. A value of 1.0 for the cosine similarity metric indicates two nodes that are identical. Conversely, the nearer to 0.0 is the value of the cosine metric, the more dissimilar are the two nodes. The cosine metric can be converted into a distance-like quantity by subtracting its value from 1.0:

$$f(N\_i, N\_j) = 1 - A\_i \cdot A\_j$$

An example of a more complex distance function is a parameterized Kernel, such as a radial basis function.

$$f(N\_i, N\_j) = \exp(\|A\_i - A\_j\|^2 / s^2),$$

where s is a parameter.

In the more general case in which the bit-string is a vector that contains numbers other than 1 and 0 (for example it contains percentages or non-normalized data), then one can calculate similarity based on distance metrics between vectors of numbers. Other metrics, such as the Mahalanobis distance, may then be applicable.

Typically, a similarity score, S, is a number between 0 and 100, though other normalization schemes could be used, such as a number between 0 and 1.0, a number between 0 and 10, or a number between 0 and 1,000. It is also possible that a scoring system could be un-normalized, and simply be expressed as a number proportional to the calculated similarity between two consumers.

In some embodiments, when calculating a similarity score, each contributing factor can be weighted by a coefficient that expresses the relative importance of the factor. For example, a person's gender can be given a higher weighting than whether they watched a particular TV show. The weightings can be initially set by application of heuristics, and can ultimately be derived from a statistical analysis of advertising campaign efficacy that is continually updated over time. Other methods of deriving a weighting coefficient used to determine the contribution of a particular attribute to the similarity score include: regression, or feature selection such as least absolute shrinkage and selection operator ("LASSO"). Alternatively, it is possible to fit to "ground truth data", e.g., login data. In some embodiments, as the system tries different combinations or features, which one leads to greater precision/recall can be deduced by using a "held out" test data set (where that feature is not used in construction of the graph).

Another way of deriving a similarity score for a feature is to analyze data from a successive comparison of advertising campaigns to consumer feedback using a method selected from: machine learning; neural networks and other multi-layer perceptrons; support vector machines; principal components analysis; Bayesian classifiers; Fisher Discriminants; Linear Discriminants; Maximum Likelihood Estimation; Least squares estimation; Logistic Regressions; Gaussian Mixture Models; Genetic Algorithms; Simulated Annealing; Decision Trees; Projective Likelihood; k-Nearest Neighbor; Function Discriminant Analysis; Predictive Learning via Rule Ensembles; Natural Language Processing, State Machines; Rule Systems; Probabilistic Models; Expectation-Maximization; and Hidden and maximum entropy Markov models. Each of these methods can assess the relevance of a given attribute of a consumer for purposes of suitability for measuring effectiveness of an advertising campaign, and provide a quantitative weighting of each.

Representation

To properly assess an entire population of consumers, a large number of nodes needs to be stored. Additionally, the collection of attributes that represent a node's types and behaviors can be sizeable. Storing the collection of the large number of attributes for the nodes is challenging, since the number of nodes can be as many as hundreds of millions. Storing the data efficiently is also important since the graph computations can be done most quickly and efficiently if the node data is stored in memory.

In a preferred embodiment, attributes are represented by sparse vectors. In order to accomplish such a representation, the union of all possible node attributes for a given type is stored in a dictionary. Then the type, or behavior, for each node is represented as a binary sparse vector, where 1 and 0 represent the presence and absence of an attribute, respectively. Since the number of possible attributes of a given type is very large, most of the entries will be 0 for a given consumer. Thus it is only necessary to store the addresses of those attributes that are non zero, and each sparse vector can be stored efficiently, typically in less than 1/100th of the space that would be occupied by the full vector.

As an example, let the attributes encode the TV programs that a given consumer has viewed in the last month. The system enumerates all possible TV shows in the dictionary, which can be up to 100,000 different shows. For each node, whether the consumer watched the show in the last month is indicated with a 1, and a 0 otherwise.

If the attributes indicate different income levels, multiple income levels are enumerated, and a 1 represents that the consumer belongs to a particular income level (and all other entries are 0).

Thus for a consumer, i, having an annual income in the range $30,000-$60,000, and who has viewed "Top Gear" in the last month, the following is established:

TV_Dictionary={"Walking Dead","Game of Thrones", . . . "Top Gear"}

TV_i=[0,0, . . . ,1]

TV_i can be stored as simply [4]; only the 4th element of the vector is non-zero. Similarly, for income:

Income_Dictionary={<$30,000,$30,000-$60,000,$60,000-$100,000,>$100,000}Income_i=[0,1,0,0]

Income_i can be stored as simply [2], as only the second element of the vector is non-zero.

All the attributes of a node, i, can thus be efficiently represented with sparse vectors. This requires 2 to 3 orders of magnitude less memory than a dense representation.

Graph Construction

Figure 4A:
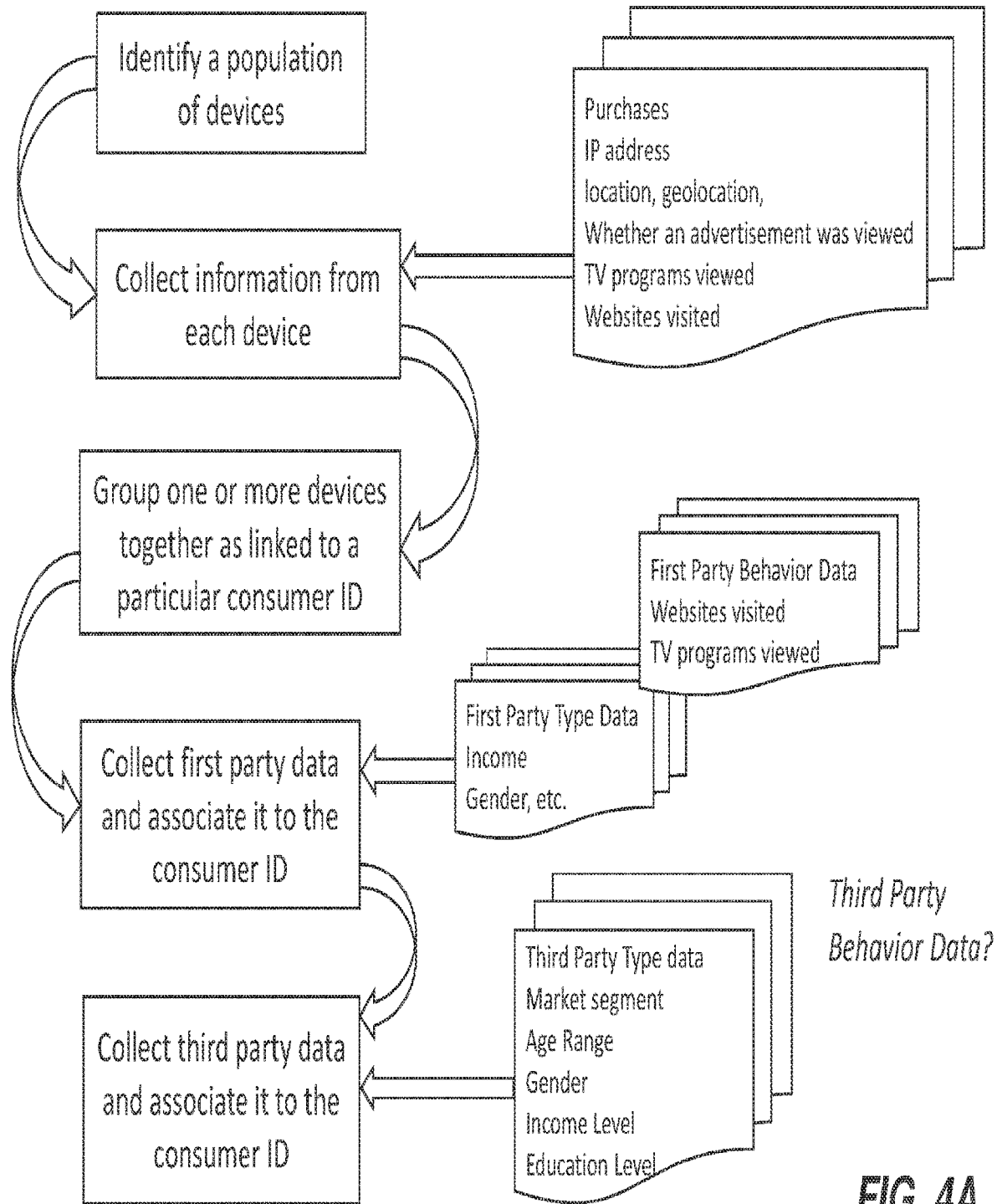
FIGS. 4A and 4B show steps in creation of a consumer graph.
Figure 4B:
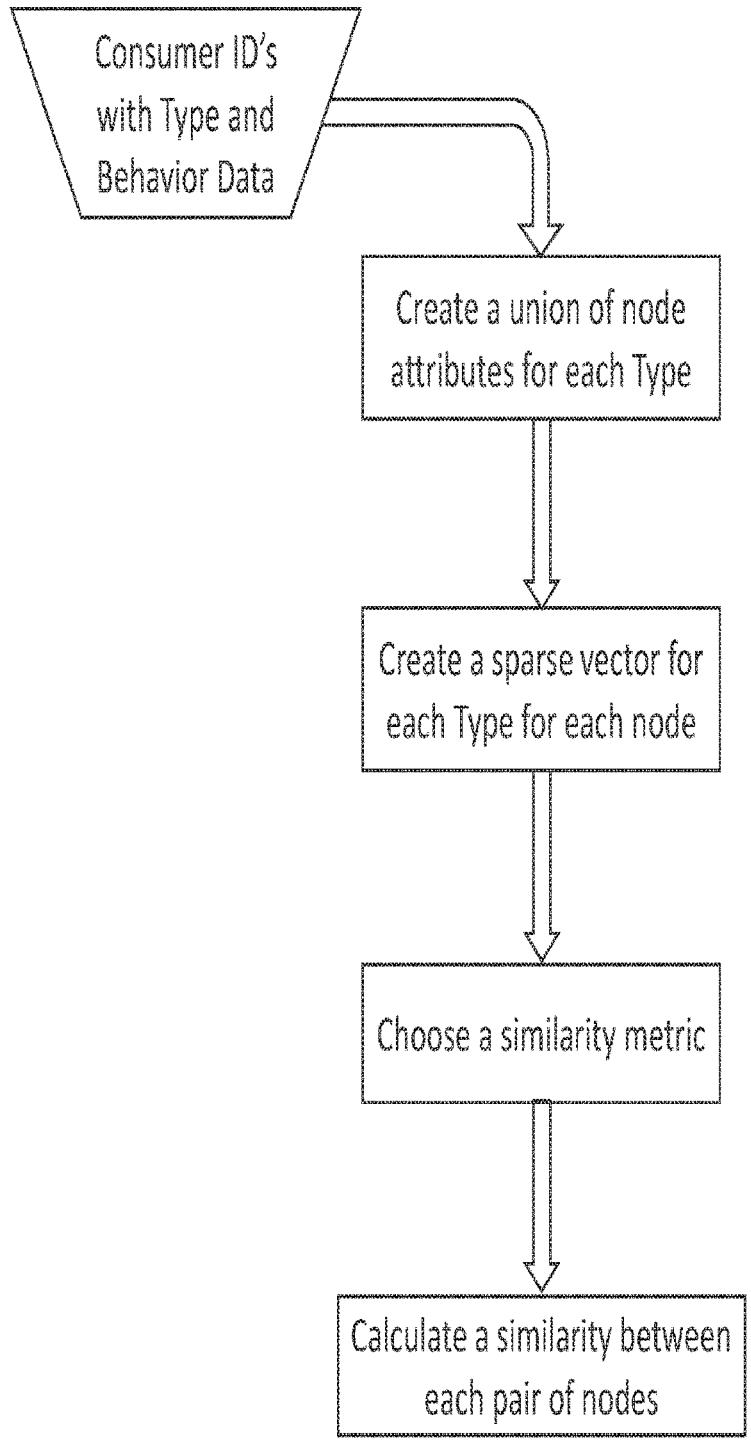

FIGS. 4A and 4B illustrate a flow-chart for steps in construction of a consumer graph. Preferably computer system performing the method is flexibly programmed and thereby relies on an ability to accept an unlimited number of inputs including but not limited to: behavioral such as specific viewing and purchasing histories of individual consumers, as well as demographic, and location-related sources.

Initially, the graph is a collection of devices, which are mapped to consumers. Multiple data sources are used to group multiple devices (tablet, mobile, TV, etc.) to a single consumer. This typically utilizes agglomerative techniques. In order to attribute a single device (e.g., a Smart TV) to multiple consumers, a refinement technique is used.

With agglomerative methods, multiple devices can be grouped to a single consumer (or graph node). Some data sources used for this include, but are not limited to:

IP addresses: multiple devices belonging to same IP address indicates a single consumer or a household.

Geolocation: multiple devices that are nearby, using latitude and longitude, can be attributed to a single consumer.

Publisher logins: if the same consumer is logged in from multiple devices, those devices can be associated with that consumer.

During this process, the consumer's identity is masked, to obviate privacy concerns. The result is a single consumer ID that links particular devices together.

Let $P(d\_i, d\_j)$ be the probability that the two devices, $d\_i$ and $d\_j$, belong to the same node (consumer, or household). From multiple datasets obtained from different categories of device, it is possible to construct the probability:

$$P(d\_i,d\_j)=w\_IP \times P(d\_i,d\_j|IP) \times w\_Geo \times P(d\_i,d\_j|Geo) \times w\_Login \times P(d\_i,d\_j|Login)/Z$$

where "×" means "multiply", where w_ are weighting factors, $P(d\_i, d\_j|Y)$ is a conditional probability (the probability of observing device i and device j belong to same user, if Y has the same value for both, and Z is a normalizing factor. Thus, Y may be an IP address. (The value of the conditional probability may be 0.80). Each data source gets a different weighing factor: for example, login data can be weighted higher than IP addresses. The weights can be fixed, or learned from an independent validation dataset.

Once multiple devices are grouped to a single node, the Types and Behaviors from the respective devices are aggregated to the singular node's attributes. For example, attributes (and the corresponding sparse vectors) from mobile (such as location events), and desktop (recent purchases) are aggregated. This provides more comprehensive information for a consumer, permitting more accurate and meaningful inferences for a node to be made.

Associating a device with a given consumer is possible due to the data that is associated with those devices and known to various media conduits. For examples, a Smart-TV stores location information as well as subscription information about the content broadcast by it. This information is shared with, and can be obtained from, other entities such as a cable company. Similarly, a mobile device such as a tablet or smartphone may be associated with the same (in-home) wifi network as the Smart-TV. Information about the location is therefore shared with, e.g., the cell-phone carrier, as well as broadcasters of subscription content to the mobile device. A key aspect of the graph methodology herein is that it permits consumer information to be linked across different device and media platforms that have typically been segregated from one another: in particular, the graph herein is able to link consumer data from online and offline purchasing and viewing sources with TV viewing data.

With refinement methods, a single device (for example, a smart TV) can be associated with multiple consumers (or graph nodes) who, for example, own mobile devices that are connected to the same wifi network as the smart-TV.

Given a node, n, to which are assigned multiple devices, the various attributes are clustered into smaller groups of devices, for example, a TV ID, connected to multiple devices from a common IP address. The TV viewership data is aggregated along with the attributes from all the devices. A clustering algorithm, such as k-means clustering, can be applied to group the devices into smaller clusters. The number of clusters, k, can be set generally by the number of devices (by default k=#number of devices/4). Sometimes it is possible to only collect aggregate data at a household level. For example, there may be as many as 20 devices in one household. But by using behavioral data, it can be ascertained that the 20 devices have 4 major clusters, say with 5 devices each, where the clusters correspond to different individuals within the same household. Thus, although there are two categories of device (shared and personal), it is still important to attribute behavioral data to users.

Once a shared device is attributed to multiple nodes, the data collected from the device can be attributed to the nodes. For example, TV viewing data from a Smart TV can be collected from the OEM. Through this attribution, the TV viewing data can be added to the collection of a node's attributes. Ultimately, a Smart-TV can be attributed to different persons in the same household.

Lookalike Modeling by Learning Distance Functions

Given a graph, G(N, E), and a functional form that defines a similarity metric, and a set of seed nodes, it is possible to generate a set of "lookalike" nodes that are similar to the seed nodes, where similarity is defined by a function that is fixed, or learned. This is useful when identifying new consumers who may be interested in the same or similar content as a group of consumers already known to an advertiser. Similar principles can be utilized when projecting likely viewing behavior of consumers from historical data on a population of consumers.

Seed nodes can be a set of nodes, e.g., household(s) or individual(s), from which to generate a set of lookalike nodes using a fixed, or learned, similarity metric. For example, seed nodes can be defined as an audience segment (such as list of users that saw a specific show for certain). This is useful for determining, for each member of the audience segment, a list of other audience members who might have similar viewing habits even if they did not watch exactly the same show as the seeds.

Given the set of seed nodes in a graph (and their attributes), the output of lookalike modeling is a set of nodes (that includes the seed nodes) that are similar to the seed nodes based on the fixed or learned similarity metric.

Several different vectors can be used in determining look-alike models: One is the vector of TV programs in total. This vector can be as long as 40 k elements. Another vector is the list of consumers who saw a particular program (e.g., The Simpsons). The vector of viewers for a given TV program can be as long as 10M elements, because it contains one element per consumer. Another vector would be a vector of web-sites visited (say 100 k elements long). Still another vector would be based on online videos viewed (which can also be 100 k elements long).

In general, TV program comparison data accesses a 10M user base. Online data can identify a potentially much larger audience, such as 150M consumers. It should be understood that TV data can be accumulated across a variety of TV consumption de The similarity between 2 distinct nodes can be calculated from their attributes, represented by sparse vectors. Given a distance function $f(N\_i, N\_j)$, and a set of seed nodes, N_S, the pairwise distances between each element of the seed nodes, n in N_S, and all other nodes other than the seed node, n', are calculated. That is, all quantities f(n, n') are calculated.

After calculating all pairwise similarities, only the nodes such that f(n, n')<T are selected. T is a threshold maximum distance below which the nodes are deemed to be similar. Alternatively, values of f(n, n') (where n is not n') are ranked in decreasing order, and the top t node pairs are selected. In either case, T and t are parameters that are preset (provided to the method), or learned from ground truth or validation data. The set of all nodes n' that satisfy the criteria above, form the set of "lookalike nodes".

Graph Inference

Given a graph G(N, E), it is also possible to infer likely attributes of a node, n, based on the attributes of its neighbors in the graph. This can be useful when incomplete information exists for a given consumer but where enough exists from which inferences can be drawn. For example, TV viewership attributes may be missing for a node n (in general, there is either positive information if a user did watch a show, or it is unknown whether they watched it), whereas those attributes are available for neighbor nodes n', n" in the graph. Nodes n, n', and n" contain all other attributes, such as income level and websites visited.

In another example, it can be useful to calculate the probability that the consumer associated with node n would watch the show "Walking Dead", given that n', n" both also watch "Walking Dead". If the similarity, given by the weight of the edges between n and n', n", are w', w"=0.8 and 0.9 respectively, and the likelihood of n watching the show based on his/her own attributes is 0.9, then the probability is given by:

$$P(n \text{ watches "Walking Dead"})=[0.8\times0.9+0.9\times0.9]/[0.8\times0.9+0.9\times0.9+(1-0.8\times0.9)+(1-0.9\times0.9)]=0.765$$

Similar principles can be utilized when projecting likely viewing behavior of consumers from historical data on a population of consumers.

Accuracy

The graph is continually refined as new data is received. In one embodiment, a technique such as machine learning is used to improve the quality of graph over time. This may be done at periodic intervals, for example at a weekly build stage.

To determine the accuracy of the graph, the precision and recall can be compared against a validation dataset. The validation dataset is typically a (sub)graph where the device and node relationships are known with certainty. For example, the login information from an online network such as eHarmony, indicates when the same user has logged into the site from different desktops (office, laptop), and mobile devices (smartphone and tablet). All the devices that are frequently used to login to the site are thus tied to the same consumer and thereby that individual's graph node. This information can be used to validate whether the constructed graph ties those devices to the same node.

If D is the set of devices in the validation set, let Z(D) denote the graph, consisting of a set of nodes, constructed from the set of devices, D. For different datasets, and different graph construction methods, it is possible to obtain different results for Z(D).

For the set Z(D), true positive (TP), false positive (FP), and false negative (FN) rates can all be calculated. True positives are all nodes in Z(D) that are also nodes in the validation set. False positives are all nodes in N(D) that do not belong to the set of nodes in the validation set. False negatives are all nodes that belong to the validation set, but do not belong to Z(D).

Precision, defined as TP/(TP+FP), is the fraction of retrieved devices that are correctly grouped as consumer nodes.

Recall, defined as TP/(TP+FN), is the fraction of the consumer nodes that are correctly grouped.

Depending on the application at hand, there are different tradeoffs between precision and recall. In the case of constructing a consumer graph, it is preferable to obtain both high precision and high recall rates that can be used to compare different consumer graphs.

The validation dataset must not have been used in the construction of the graph itself because, by doing so, bias is introduced into the precision and recall values.

Learning the Similarity Metric:

Another feature of the graph that can be adjusted as more data is introduced is the underlying similarity metric. Typically, the metric is fixed for long periods of time, say 5-10 iterations of the graph, and the metric is not reassessed at the same frequency as the accuracy.

In the case where the distance function is not fixed, it is possible to learn the parameters of a particular distance function, or to choose the best distance function from a family of such functions. In order to learn the distance function or its parameters, the values of precision and recall are compared against a validation set.

Suppose a goal is to predict the lookalike audience segment that are high income earners, based on the attributes of a seed set of known high income earners. The similarity of the seed nodes to all other nodes in the graph is calculated for different distance functions, or parameters of a particular distance function. The distance function uses the attributes of the nodes, such as online and TV viewership, to calculate the similarities.

For example, if the distance function is the radial basis function with parameter, s:

$$f(N\_i, N\_j) = \exp(\|A\_i - A\_j\|^2 / s^2),$$

then the pairwise distances from the seed nodes to all other nodes, are calculated for different values of s, using the same threshold distance value, T, to generate the set of lookalike nodes. For different values of s (the parameter that needs to be learned), the calculations produce different sets of lookalike nodes, denoted by N_S(s).

For the set N_S(s), it is possible to calculate true positive (TP), false positive (FP) and false negative (FN) rates. True positives are all nodes in N_S(s) that also belong to the target set in the validation set. In this example, all the nodes that are also high income earners (in ground truth set). False positives are all nodes in N_S(s) that do not belong to the target set (not high income earners). False positives are all nodes in N_S(s) that do not belong to the target set (not high income earners). False negatives are all nodes that belong to the validation set (are high income earners), but do not belong to N_S(s).

Based on the application, it is possible to require different tradeoffs between precision and recall. In the case of targeting an audience with an advertisement, a high recall rate is desired, since the cost of exposure (an advertisement) is low, whereas the cost of missing a member of a targeted audience is high.

In the example herein, the aim is to choose the value of s for which both the precision and recall rates are high from amongst possible values of s. For other types of distance function, there may be other parameters for which to try to maximize the precision and recall rates.

The accuracy of a lookalike model can only be defined for a target audience segment. For example, it is possible to predict whether a lookalike segment also comprises high income earners, from a seed set of high income earners using TV viewing and online behavior datasets. Predictions can be validated using a true set of income levels for the predicted set of nodes. This gives the accuracy of the predictions. However, the accuracy of predictions for one segment are not meaningful for a new target segment, such as whether those same users are also luxury car drivers.

Calculating Deduplicated Reach

The consumer graph connects a node (consumer) to all the devices that he or she uses. Thus the graph enables deduplicating the total exposure to an advertisement, to individuals. For example, if user abc123 has already seen a particular advertisement on each of his TV, desktop and mobile device, the total deduplicated exposures will count as 1. This enables the calculation of the following metrics for direct measurement.

The deduplicated exposed audience is the number of users belonging to the target audience segment in the consumer graph who were exposed to the advertisement after deduplication. Then, the direct deduplicated reach is:

Deduplicated Reach=Deduplicated Exposed Audience/Total Audience

For sampled measurement, this enables the calculation of the deduplicated exposed sampled audience as the number of sampled users who belong to the target audience segment who were exposed to the advertisement after deduplication. Then, the sampled reach is:

Deduplicated Sampled Reach=Deduplicated Exposed Sampled Audience/Total Sampled Audience In the case of modeled measurement data, the ID of the user in the consumer graph from whom the data was collected is not known. Hence, the reach data cannot be deduplicated on a one-to-one level.

Calculation of deduplicated reach can be useful in sequential targeting, if an advertiser wants to impose a frequency cap on consumers (for example, if the advertiser doesn't want to show the same advert to the same user more than twice). Deduplicated reach also provides a convenient metric by which to optimize the efficacy of an advertising campaign: for example, by calculating the deduplicated reach over time, as an advertising campaign is adjusted, improvements can continue to be made by altering parameters of the campaign such as, for example, consumer demographic, or time and channel of broadcast of TV content.

Calculating Incremental Reach

On day t, let the deduplicated reach (direct or sampled) be x. The incremental reach is the additional deduplicated reach after running the campaign. In a cross-screen environment, this is a useful parameter to calculate if an advertiser wants to be able to assess whether they can extend a 30% reach via TV to say, a 35% reach by extending to mobile platforms. One caveat is that in direct measurement of, e.g., TV data, the portion of the sample obtained for smart-TV's is only a subset of the overall data, due to the relatively small number of smart-TV's currently in the population at large.

In the case of modeled measurement data such as is obtained from a panel where the nature of the sample has to be inferred, the ID of the user in the consumer graph from whom the data was collected is not known. Hence, it is not possible to tell if the same user has viewed the advertisement in the past. Therefore the incremental deduplicated reach cannot be calculated for modeled data because devices cannot be associated with particular users. Since the incremental reach from the sampled measurement, without deduplication, can be calculated, as described above, the methods herein are superior to panel-based methods.

First Party Audience Measurement

The consumer graph enables the calculation of the Total Reach, combined from direct and sampled data, for a First Party audience segment. The first party audience segment is the target audience composed of consumers in the graph. For example, a publisher like Truecar.com or ESPN.com can provide a list of all visitors to their website. The visitors are mapped to nodes of the graph. Furthermore, the subset of nodes from which sampled data can be collected can be identified. The following quantities can be calculated from the intersection of consumers (nodes) that are in the total and sampled dataset. The Total First Party Reach is given by:

Deduplicated First Party Exposed Audience=Deduplicated Exposed Audience+ Deduplicated Exposed Sampled Audience− Number of advert exposures on devices common to both graph and sampled dataset.

That is, the exposed audience numbers from direct and sampled measurements are combined, and the devices common to the two datasets are subtracted from the result.

Deduplicated First Party Reach=Deduplicated First Party Exposed Audience/Total Audience.

Thus the consumer graph combined with direct and sampled data allows calculation of reach and frequency against first party data, which extends measurement beyond demographic segments (such as age, gender, and income) that measurement solutions like Nielsen and Rentrak typically provide.

It should be noted that some measures, such as GRP's, are meaningful for a general audience, but not for a targeted group. Conversely, for a targeted audience, a better measure is, for example, a TRP. Deduplicated reach can only practically be calculated for a targeted audience. Advantageously, however, the methods herein are different from a panel approach in which it is not possible to calculate deduplicated reach or accurate numbers on reach.

Method for Improved Cross-Screen Measurement

The system normalizes the data by creating multi-dimensional classifications per consumer. Whereas other systems used in the art roll up consumer data into a single profile with one-dimensional analysis, the system herein allows for a multi-dimensional profile that maintains a number of device classifications per consumer. For example, existing methods of analysis will add all data of a single consumer into a single viewership statistic such as combining together all "events involving social media," or "web searches for BMW's", regardless of where they were performed. By contrast, the system herein maintains device classifications for each point of viewership data, and is capable of linking data from multiple consumer devices. Thus, the computation of predictions maintains the device classifications as it reviews a consumer's viewing habits. A prediction, such as the time of day a consumer spends on their phone compared to the time spent on their laptop computer viewing BMW listings, can be made with greater accuracy.

The system measures the accuracy of its predictions against incoming viewership data, thereby creating a data feedback loop. The system calculates brand lift data (a measure of increase in brand awareness as a result of a campaign)—from survey data, and sales lift data (a measure of increase in sales due to ads) from point of sale data, (e.g., online purchase data, from companies like ShopCom, KantarMedia), which it then tests against existing predictive models to determine their accuracy. The difference(s) between the predicted behaviors and the actual behaviors is/are used to adjust the prediction algorithms, and the model adjusts accordingly. Adjustments can be performed on a consumer-to-consumer basis. The feedback loop adjustments can be made in real-time, as new data is generated by consumer actions. The predictive model can make such statements as: "we know that advertisement reached x % of market segment A, if you take the following next steps (from a predictive model), we can predict that you will increase reach by y %."

In addition to measuring actual behavior, the system can link consumer data to census data. Census data is collected from vendors that conduct both online and offline surveys. Sample data from consumer behavior is overlaid on census data to provide measurements of potential reach to consumers. This process is designed to improve the predictive model because it can gauge for anticipated changes based on changing and evolving opinions collected through census surveys.

Cross-screen analysis and models are able to determine where and when a consumer has viewed an ad, and permit advertisers to schedule sequential viewing of an advertising campaign, as further described in co-pending U.S. application Ser. No. 15/219,264 filed Jul. 25, 2016, entitled "SEQUENTIAL DELIVERY OF ADVERTISING CONTENT ACROSS MEDIA DEVICES". Advertisers can schedule where, when, and how an advertisement is broadcast. They have control over retargeting (whether they show the same advertising content more than once), or can choose to broadcast a multi-chapter advertising story. This is achieved via the feedback data loop which informs the system when a particular consumer has viewed the advertisement in real-time.

Cross Screen Measurement with First Party Data

The data used can be raw data, directly measured data, or modeled data, or any combination of the same.

Raw data used for measuring an audience can come from three different types of sources: directly from each device, sampled from a subset of the audience population, or modeled to the audience population from a panel.

In the case of direct measurement, data is collected from each device on whether the device was exposed to the advertisement. For example, in the case of online video advertisements, tags such as provided within the VAST (Video Ad Serving Template) or VPAID (Video Player Ad-Serving Interface Definition) formats are used to collect data on whether the advertisement was exposed in the browser or mobile device, and for how long it was in the viewable area. The coverage of device data is universal, and represents an accurate sample of a population according to census data.

The total audience is then the number of users who belong to the target audience segment in the consumer graph. For example, if the target audience is males, aged 25 and over, who are high income earners, and 2.1 M such consumers are identified in the consumer graph, then:

Total Audience (Male, 25+, high income earners)=2.1 M

Exposed Audience=number of users belonging to the target audience segment in the consumer graph who were exposed to the advertisement From this, the direct reach is:

Reach=Exposed Audience/Total Audience

In the case of sampled measurement, data is collected from a subset of devices on whether the device was exposed to the advertisement. For example, in the case of OEM Smart TVs, Set Top Boxes, or OTT devices, data is only collected from a subset of the population that have those specific devices.

Figure 5:
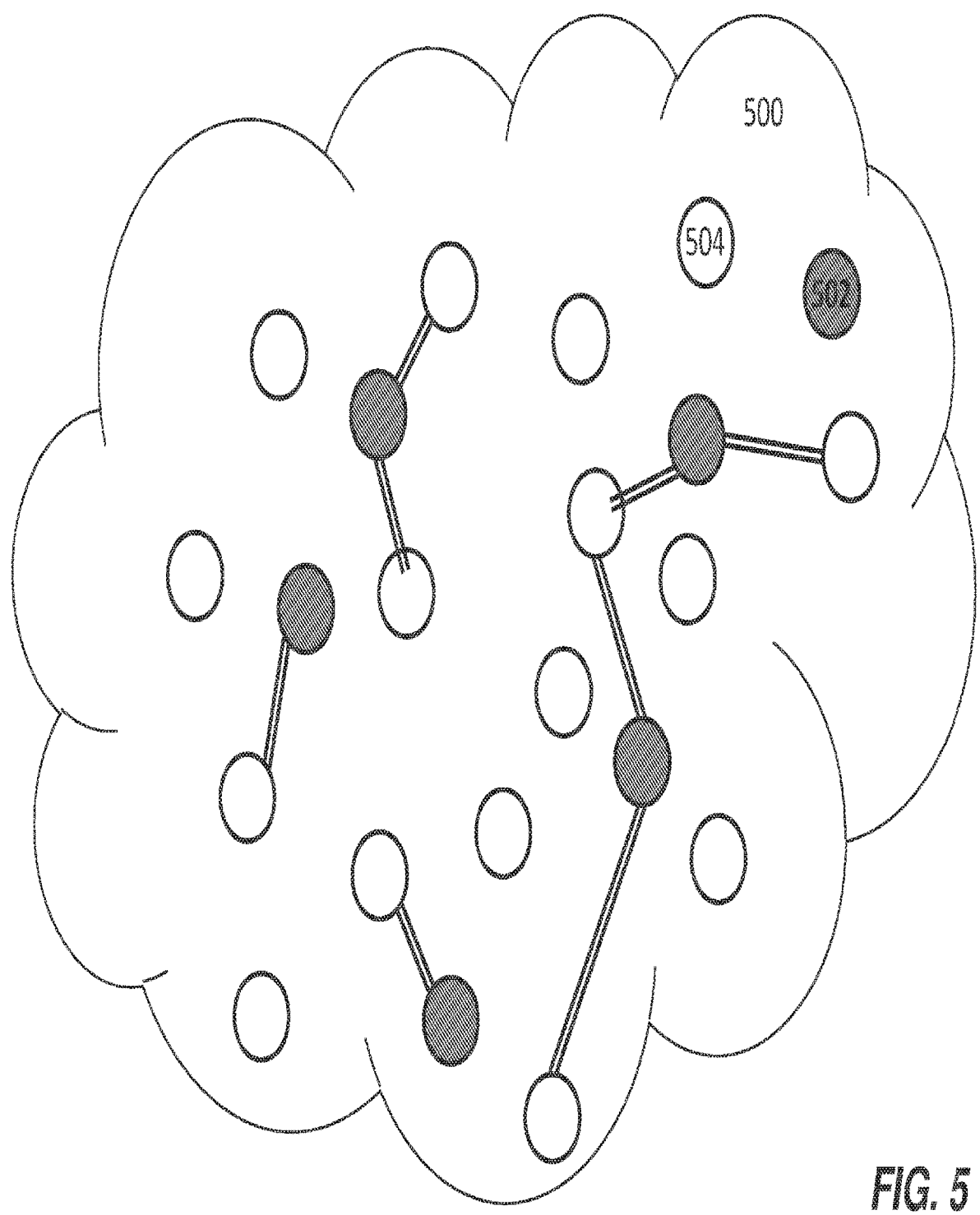
FIG. 5 shows a sample consumer population.

As shown in FIG. 5, the consumer graph is representative of the population (cloud) in the target audience (all circles having a black border). The sampled measurement data is available from a subset of the consumers (filled circles). The consumer graph is then used to normalize and de-bias the data collected from the target audience segment in, for example, the following way. The sampled audience in the target audience segment is:

Total Sampled Audience=number of sampled users who belong to the target audience segment in the consumer graph.

Exposed Sampled Audience=number of sampled users who belong to the target audience segment who were exposed to the advert or media.

Then, the sampled reach is

Sampled Reach=Exposed Sampled Audience/Total Sampled Audience

The Sampled Audience dataset can be a biased representation of the actual population distribution. In this case, a normalizing factor is applied to de-bias the reach calculations.

$$\text{Audience Normalizing Factor} = \frac{[\text{Total Audience/Total Population}]}{[\text{Total Sampled Audience/Sampled Population}]} =$$

$$[\text{Total Audience/Total Sampled Audience}]/[\text{Sampled Population/Total Population}] = (\text{Total Audience} \times \text{Sampled Population})/$$

$$(\text{Total Population} \times \text{Total Sampled Audience})$$

Equivalently,

Audience Normalizing Factor=Total Audience Percentage/Sampled Audience Percentage For example, if the percentage of Males, 25+, in the general population is 25%, and the percentage of Males, 25+, in the sampled population is 50% (i.e., they are overrepresented in the sampled population by a factor of 2), then the Audience Normalizing Factor=0.25/0.50=0.50.

The sampled reach is adjusted by multiplying with the Audience Normalizing Factor, as follows:

Adjusted Sampled Reach=(Exposed Sampled Audience/Total Sampled Audience)*Audience Normalizing Factor In certain measurement datasets, like those used by Nielsen, the advertisement exposure data is collected from an unknown panel, and representative models are constructed for the population. This is modeled data. See, e.g., http://sites.nielsen.corn/totalaudience/

Cross-Screen Frequency

The frequency is the number of times the same user or device has been exposed to a given advertisement. The consumer graph enables calculation of the number of times a consumer has been exposed to an advertisement across all of his or her devices. Thus the cross-screen frequency is given by:

Cross-Screen Frequency=Deduplicated Exposed Audience/Average number of devices for Audience The average number of devices per consumer for the target audience segment can be calculated from the consumer graph. The same quantity can also be calculated for a given individual consumer.

Redundancy: Parameters to change: audience members; inventory (TV spot, online website), time of day, region, and network. Can deduce from measurement that, e.g., a particular channel is not effective. Can try to enable frequency capping. For programmatic TV can send ads to a DMA; for digital and OTT, can deliver on an individual basis.

Monitoring and Measuring Cross-Screen Advertising Content

The technology described herein permits an advertiser to target advertising content to a consumer across more than one media conduit, including both TV and online media, and then to quantify the progress of the campaign. There are two types of environment in which an advertiser can target a consumer. In a 1:1 environment, a DSP can just use the actual segment and/or a modeled out version of the actual segment, to make a real time decision to place the advert if the consumer matches the targeting parameters. In an index approach, when it is not possible to target 1:1 and it is not possible to do dynamic advert insertion or real time decisioning, the system instead looks at concentration of viewers projected to access the slot (such as a TV program or VOD program) and then targets the slots that have the highest concentration of the target consumers.

In a preferred embodiment, the advertiser has control over the allocation of the advertising content because the advertiser accesses the system via a unified interface that presents information about inventory, manages bids on the inventory, and provides a list of potential advertising targets consistent with a campaign description and the advertiser's budget. The system then communicates with, for example, supply-side providers to ensure that the desired slots are purchased, typically via a bidding process, and the advertising content is delivered or caused to be delivered.

In one embodiment, the technology provides for an advertising campaign that involves delivery of content across two or more media conduits, rather than delivery of a single advertisement to multiple consumers at different times on, say, TV only. The system thereby permits delivery of advertising content to a given consumer, or a population of consumers, on more than one device. For example, a consumer may view a portion of the campaign on a TV, and may also see the campaign within a desktop browser session on their laptop or on their OTT device. In this context, the TV inventory can be purchased across a variety of TV consumption devices that include, but are not limited to linear, time-shifted, traditional and programmatic TV, according to bid methodology described herein or familiar to those skilled in the art. In some instances, the advertiser desires to cap the number of impressions that a given consumer receives; in other instances, the advertiser wants to extend the campaign from one media to another based on metrics calculated across various media conduits. The method permits the advertiser to target segments of a population more precisely than before, as well as measure at a fine scale the success of a campaign based on performance indicators from more than one conduit.

Computational Implementation

The computer functions for manipulations of advertising campaign data, advertising inventory, and consumer and device graphs, in representations such as bit-strings, can be developed by a programmer or a team of programmers skilled in the art. The functions can be implemented in a number and variety of programming languages, including, in some cases mixed implementations. For example, the functions as well as scripting functions can be programmed in functional programming languages such as: Scala, Golang, and R. Other programming languages may be used for portions of the implementation, such as Prolog, Pascal, C, C++, Java, Python, VisualBasic, Perl, .Net languages such as C #, and other equivalent languages not listed herein. The capability of the technology is not limited by or dependent on the underlying programming language used for implementation or control of access to the basic functions. Alternatively, the functionality could be implemented from higher level functions such as tool-kits that rely on previously developed functions for manipulating mathematical expressions such as bit-strings and sparse vectors.

The technology herein can be developed to run with any of the well-known computer operating systems in use today, as well as others, not listed herein. Those operating systems include, but are not limited to: Windows (including variants such as Windows XP, Windows95, Windows2000, Windows Vista, Windows 7, and Windows 8, Windows Mobile, and Windows 10, and intermediate updates thereof, available from Microsoft Corporation); Apple iOS (including variants such as iOS3, iOS4, and iOS5, iOS6, iOS7, iOS8, and iOS9, and intervening updates to the same); Apple Mac operating systems such as 0S9, OS 10.x (including variants known as "Leopard", "Snow Leopard", "Mountain Lion", and "Lion"; the UNIX operating system (e.g., Berkeley Standard version); and the Linux operating system (e.g., available from numerous distributors of free or "open source" software).

To the extent that a given implementation relies on other software components, already implemented, such as functions for manipulating sparse vectors, and functions for calculating similarity metrics of vectors, those functions can be assumed to be accessible to a programmer of skill in the art.

Furthermore, it is to be understood that the executable instructions that cause a suitably-programmed computer to execute the methods described herein, can be stored and delivered in any suitable computer-readable format. This can include, but is not limited to, a portable readable drive, such as a large capacity "hard-drive", or a "pen-drive", such as connects to a computer's USB port, an internal drive to a computer, and a CD-Rom or an optical disk. It is further to be understood that while the executable instructions can be stored on a portable computer-readable medium and delivered in such tangible form to a purchaser or user, the executable instructions can also be downloaded from a remote location to the user's computer, such as via an Internet connection which itself may rely in part on a wireless technology such as WiFi. Such an aspect of the technology does not imply that the executable instructions take the form of a signal or other non-tangible embodiment. The executable instructions may also be executed as part of a "virtual machine" implementation.

The technology herein is not limited to a particular web browser version or type; it can be envisaged that the technology can be practiced with one or more of: Safari, Internet Explorer, Edge, FireFox, Chrome, or Opera, and any version thereof.

Computing Apparatus

Figure 6:
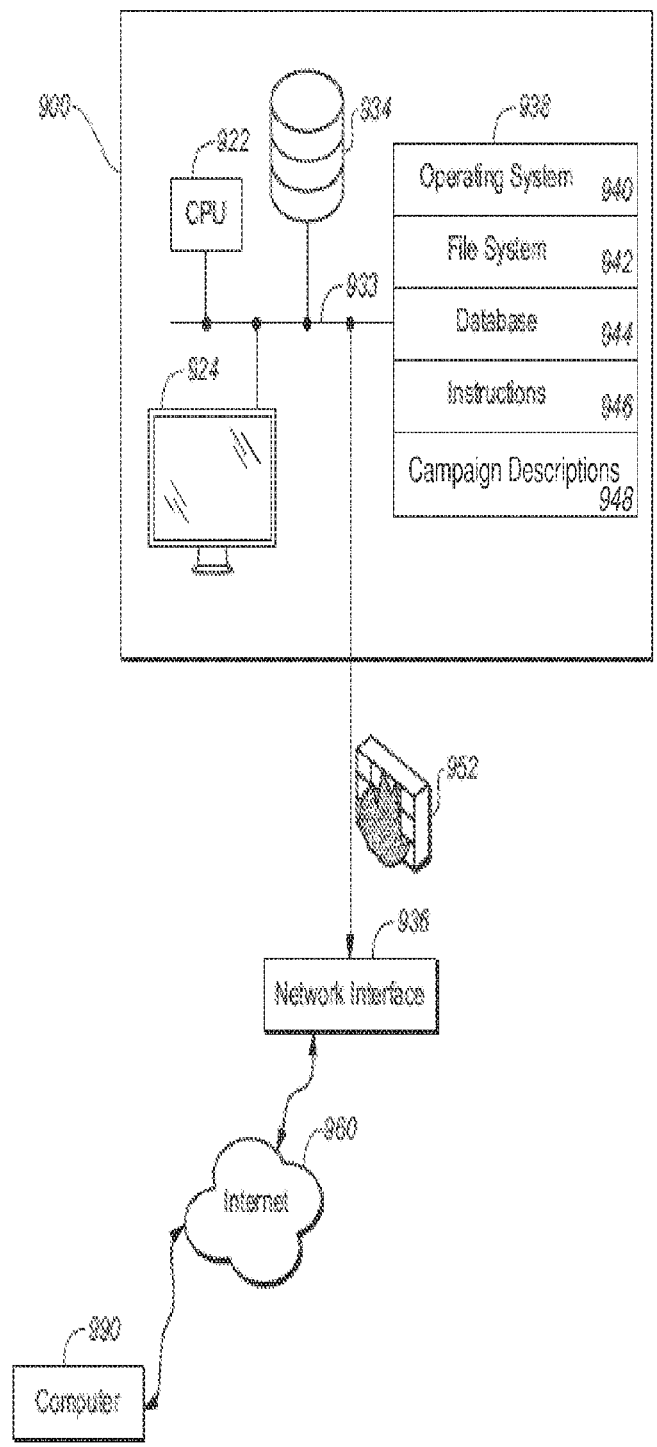
FIG. 6 shows an apparatus for performing a process as described herein.

An exemplary general-purpose computing apparatus 900 suitable for practicing the methods described herein is depicted schematically in FIG. 6.

The computer system 900 comprises at least one data processing unit (CPU) 922, a memory 938, which will typically include both high speed random access memory as well as non-volatile memory (such as one or more magnetic disk drives), a user interface 924, one more disks 934, and at least one network or other communication interface connection 936 for communicating with other computers over a network, including the Internet, as well as other devices, such as via a high speed networking cable, or a wireless connection. There may optionally be a firewall 952 between the computer and the Internet. At least the CPU 922, memory 938, user interface 924, disk 934 and network interface 936, communicate with one another via at least one communication bus 933.

CPU 922 may optionally include a vector processor, optimized for manipulating large vectors of data.

Memory 938 stores procedures and data, typically including some or all of: an operating system 940 for providing basic system services; one or more application programs, such as a parser routine 950, and a compiler (not shown in FIG. 6), a file system 942, one or more databases 944 that store advertising inventory 946, campaign descriptions 948, and other information, and optionally a floating point coprocessor where necessary for carrying out high level mathematical operations. The methods of the present invention may also draw upon functions contained in one or more dynamically linked libraries, not shown in FIG. 6, but stored either in memory 938, or on disk 934.

The database and other routines shown in FIG. 6 as stored in memory 938 may instead, optionally, be stored on disk 934 where the amount of data in the database is too great to be efficiently stored in memory 938. The database may also instead, or in part, be stored on one or more remote computers that communicate with computer system 900 through network interface 936.

Memory 938 is encoded with instructions for receiving input from one or more advertisers and for calculating a similarity score for consumers against one another. Instructions further include programmed instructions for performing one or more of parsing, calculating a metric, and various statistical analyses. In some embodiments, the sparse vector themselves are not calculated on the computer 900 but are performed on a different computer and, e.g., transferred via network interface 936 to computer 900.

Various implementations of the technology herein can be contemplated, particularly as performed on computing apparatuses of varying complexity, including, without limitation, workstations, PC's, laptops, notebooks, tablets, netbooks, and other mobile computing devices, including cell-phones, mobile phones, wearable devices, and personal digital assistants. The computing devices can have suitably configured processors, including, without limitation, graphics processors, vector processors, and math coprocessors, for running software that carries out the methods herein. In addition, certain computing functions are typically distributed across more than one computer so that, for example, one computer accepts input and instructions, and a second or additional computers receive the instructions via a network connection and carry out the processing at a remote location, and optionally communicate results or output back to the first computer.

Control of the computing apparatuses can be via a user interface 924, which may comprise a display, mouse 926, keyboard 930, and/or other items not shown in FIG. 6, such as a track-pad, track-ball, touch-screen, stylus, speech-recognition, gesture-recognition technology, or other input such as based on a user's eye-movement, or any subcombination or combination of inputs thereof. Additionally, implementations are configured that permit a purchaser of advertising inventory to access computer 900 remotely, over a network connection, and to view inventory via an interface having attributes comparable to interface 924.

In one embodiment, the computing apparatus can be configured to restrict user access, such as by scanning a QR-code, gesture recognition, biometric data input, or password input.

The manner of operation of the technology, when reduced to an embodiment as one or more software modules, functions, or subroutines, can be in a batch-mode—as on a stored database of inventory and consumer data, processed in batches, or by interaction with a user who inputs specific instructions for a single advertising campaign.

The results of matching advertising inventory to criteria for an advertising campaign, as created by the technology herein, can be displayed in tangible form, such as on one or more computer displays, such as a monitor, laptop display, or the screen of a tablet, notebook, netbook, or cellular phone. The results can further be printed to paper form, stored as electronic files in a format for saving on a computer-readable medium or for transferring or sharing between computers, or projected onto a screen of an auditorium such as during a presentation.

ToolKit: The technology herein can be implemented in a manner that gives a user (such as a purchaser of advertising inventory) access to, and control over, basic functions that provide key elements of advertising campaign management. Certain default settings can be built in to a computer-implementation, but the user can be given as much choice as possible over the features that are used in assigning inventory, thereby permitting a user to remove certain features from consideration or adjust their weightings, as applicable.

The toolkit can be operated via scripting tools, as well as or instead of a graphical user interface that offers touch-screen selection, and/or menu pull-downs, as applicable to the sophistication of the user. The manner of access to the underlying tools by a user is not in any way a limitation on the technology's novelty, inventiveness, or utility.

Accordingly, the methods herein may be implemented on or across one or more computing apparatuses having processors configured to execute the methods, and encoded as executable instructions in computer readable media.

For example, the technology herein includes computer readable media encoded with instructions for executing a method for quantifying efficacy of an advertising campaign, the instructions comprising instructions for identifying a target audience based on one or more demographic factors; for a consumer in the target audience, instructions for identifying two or more display devices accessible to the consumer, wherein the two or more display devices comprise at least one TV and at least one mobile device, and instructions for utilizing a device graph constructed from an aggregation of TV viewing data and online behavioral data for the consumer; instructions for monitoring delivery of two or more items of advertising content to the consumers in the target audience, wherein the two or more items of advertising content comprise video content and are scheduled for delivery on the two or more devices; receiving a confirmation of whether each of the consumers viewed each of the first and second items of advertising content; and utilizing the confirmation in calculation of a deduplicated reach for the advertising campaign.

The technology herein may further comprise computer-readable media encoded with instructions for executing a method for reducing redundancy of delivery of advertising content, the instructions comprising instructions for identifying a target audience based on one or more demographic factors, wherein the target audience comprises consumers to whom an advertising campaign is directed; for a consumer in the target audience, instructions for identifying two or more display devices accessible to the consumer, wherein the two or more display devices comprise at least one TV and at least one mobile device, and wherein the identifying utilizes a device graph constructed from an aggregation of TV viewing data and online behavioral data for the consumer; instructions for monitoring delivery of two or more items of advertising content to the consumers in the target audience, wherein the two or more items of advertising content comprise video content and are scheduled for delivery on the two or more devices; instructions for receiving a confirmation of whether each of the consumers viewed each of the first and second items of advertising content; and if a consumer viewed both the first and second items of advertising content, instructions for adjusting one or more parameters of the advertising campaign, in order to reduce redundancy of delivery of advertising content to one or more of the consumers during subsequent trials of the campaign.

Correspondingly, the technology herein also includes computing apparatus having at least one processor configured to execute instructions for implementing a method for quantifying efficacy of an advertising campaign, the instructions comprising instructions for identifying a target audience based on one or more demographic factors; for a consumer in the target audience, instructions for identifying two or more display devices accessible to the consumer, wherein the two or more display devices comprise at least one TV and at least one mobile device, and instructions for utilizing a device graph constructed from an aggregation of TV viewing data and online behavioral data for the consumer; instructions for monitoring delivery of two or more items of advertising content to the consumers in the target audience, wherein the two or more items of advertising content comprise video content and are scheduled for delivery on the two or more devices; receiving a confirmation of whether each of the consumers viewed each of the first and second items of advertising content; and utilizing the confirmation in calculation of a deduplicated reach for the advertising campaign.

Furthermore, the technology herein may further include a computing apparatus having at least one processor configured to execute instructions for implementing a method for reducing redundancy of delivery of advertising content, the instructions comprising instructions for identifying a target audience based on one or more demographic factors, wherein the target audience comprises consumers to whom an advertising campaign is directed; for a consumer in the target audience, instructions for identifying two or more display devices accessible to the consumer, wherein the two or more display devices comprise at least one TV and at least one mobile device, and wherein the identifying utilizes a device graph constructed from an aggregation of TV viewing data and online behavioral data for the consumer; instructions for monitoring delivery of two or more items of advertising content to the consumers in the target audience, wherein the two or more items of advertising content comprise video content and are scheduled for delivery on the two or more devices; instructions for receiving a confirmation of whether each of the consumers viewed each of the first and second items of advertising content; and if a consumer viewed both the first and second items of advertising content, instructions for adjusting one or more parameters of the advertising campaign, in order to reduce redundancy of delivery of advertising content to one or more of the consumers during subsequent trials of the campaign.

Cloud Computing

The methods herein can be implemented to run in the "cloud." Thus the processes that one or more computer processors execute to carry out the computer-based methods herein do not need to be carried out by a single computing machine or apparatus. Processes and calculations can be distributed amongst multiple processors in one or more datacenters that are physically situated in different locations from one another. Data is exchanged with the various processors using network connections such as the Internet. Preferably, security protocols such as encryption are utilized to minimize the possibility that consumer data can be compromised. Calculations that are performed across one or more locations remote from an entity such as a DSP include calculation of consumer and device graphs, and updates to the same.

EXAMPLES

Example 1: Implementation

An implementation has been accomplished, employing apparatus and processes as described elsewhere herein. In such an implementation, a unified interface is provided by which an advertiser has control over the allocation of the advertising content because the advertiser accesses the system via the interface that presents information about inventory, manages bids on the inventory, and provides a list of potential advertising targets consistent with a campaign description and the advertiser's budget, as well as provides feedback and metrics on the success of its campaign.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the spirit or scope of the appended claims.

The invention claimed is:

1. A method, comprising:
receiving first viewership data associated with a first consumer view of an advertisement of an advertising campaign;
generating a first consumer classification based on the first viewership data;
adding the first consumer classification to a multi-dimensional classification that is specific for the first consumer, the multi-dimensional classification including at least one dimension associated with a device on which the advertisement was viewed, and at least one dimension associated with a time at which the advertisement was viewed;
calculating a predictive model of consumer behavior in view of the first consumer classification and the multi-dimensional classification for the first consumer;
receiving second viewership data associated with a second consumer view of the advertisement of the advertising campaign;
generating a second consumer classification based on the second viewership data;
calculating a first accuracy of the predictive model for the first consumer based on a preexisting validation dataset;
calculating lift data of the advertising campaign, the lift data including brand lift data and sales lift data, the brand lift data being indicative of an increase of brand awareness, the sales lift data being indicative of an increase in sales due to the advertising campaign;
comparing the lift data to the predictive model for the first consumer;
updating the predictive model for the first consumer in view of the compared lift data and the calculated first accuracy of the predictive model for the first consumer; and
sending the results of at least one of the first consumer classification, the second consumer classification, the predictive model for the first consumer, or the lift data, to a user interface.

2. The method of claim 1, wherein a first dimension of the multi-dimensional classification is associated with a device classification of the first consumer, a second dimension of the multi-dimensional classification being related to a time of day on which the advertisement was viewed.

3. The method of claim 2, wherein the multi-dimensional classification includes linked data from each dimension of the first consumer classification, wherein at least some of the dimensions represent a different device the first consumer used to view the advertisement.

4. The method of claim 2, wherein the device classification of the first consumer includes at least one of a TV, a personal computer, or a mobile device.

5. The method of claim 1, wherein the first consumer and the second consumer are a subset of a total audience of the advertising campaign.

6. The method of claim 1, wherein the predictive model for the first consumer classification is updated by:
calculating a difference between the predictive model of consumer behavior and actual consumer behavior;
using a feedback loop including an input of at least the first viewership data, the second viewership data, or a third viewership data; and
generating an output of at least an updated predictive model of consumer behavior.

7. The method of claim 6, wherein the predictive model for the first consumer classification is updated in real-time.

8. The method of claim 1, further comprising deduplicating the first viewership data of the first consumer in response to the first consumer viewing a first portion of the advertisement on a first device and viewing a second portion of the advertisement on a second device.

9. The method of claim 8, wherein the first portion of the advertisement includes a segment of the advertisement that comprises less than a full length of a runtime of the advertisement or a subset of advertisements of a plurality of advertisements intended to be viewed by the first consumer in the advertising campaign.

10. The method of claim 1, wherein the predictive model of consumer behavior includes a predicted amount of time that the first consumer is predicted to spend engaging in a particular activity on a particular type of device.

11. The method of claim 1, wherein the predictive model of consumer behavior includes a predicted time of day that the first consumer is predicted to spend engaging in a particular activity on a particular type of device in view of the multi-dimensional classification that relates a first dimension with a second dimension, the first dimension being related to the particular type of device and the second dimension being associated with the predicted time of day.

12. A non-transitory computer readable medium having stored therein executable code that, when executed by a processor, cause the processor to perform operations comprising:
receiving first viewership data associated with a first consumer view of an advertisement of an advertising campaign;
deduplicating the first viewership data of the first consumer in response to the first consumer viewing a first portion of the advertisement on a first device and viewing a second portion of the advertisement on a second device;

generating a first consumer classification based on the deduplicated first viewership data, the first consumer classification being multi-dimensional and including at least one dimension associated with a device on which the advertisement was viewed, and including at least one dimension associated with a time at which the advertisement was viewed;

calculating a predictive model of consumer behavior in view of the first consumer classification;

receiving second viewership data associated with a second consumer view of the advertisement of the advertising campaign;

deduplicating the second viewership data of the second consumer in response to the second consumer viewing the first portion of the advertisement on a third device and viewing the second portion of the advertisement on a fourth device;

generating a second consumer classification based on demographic data;

calculating a first accuracy of the predictive model for the first consumer classification based on a validation dataset, the first accuracy being different than a second accuracy of a second predictive model for the second consumer classification;

calculating lift data of the advertising campaign, the lift data including brand lift data and sales lift data, the brand lift data being indicative of an increase of brand awareness, the sales lift data being indicative of an increase in sales due to the advertising campaign;

comparing the lift data to the predictive model for the first consumer classification;

updating the predictive model for the first consumer classification in view of the compared lift data and the calculated first accuracy of the predictive model for the first consumer classification; and sending the results of at least one of the first consumer classification, the second consumer classification, the predictive model for the first consumer classification, or the lift data, to a user interface.

13. The non-transitory computer readable medium of claim 12, wherein the first consumer classification includes linked data from each dimension of the first consumer classification, wherein each dimension represents a different device the first consumer used to view the advertisement.

14. The non-transitory computer readable medium of claim 12, wherein the device of the first consumer includes at least one of a TV, a personal computer, or a mobile device.

15. The non-transitory computer readable medium of claim 12, wherein the first consumer and the second consumer are a subset of a total audience of the advertising campaign.

16. The non-transitory computer readable medium of claim 12, wherein the predictive model for the first consumer classification is updated by calculating a difference between the predictive model of consumer behavior and actual consumer behavior, using a feedback loop including an input of at least the first viewership data, the second viewership data, or a third viewership data, and generating an output of at least an updated predictive model of consumer behavior.

17. The non-transitory computer readable medium of claim 16, wherein the predictive model for the first consumer classification is updated in real-time.

18. The non-transitory computer readable medium of claim 12, the operations further comprising deduplicate the first viewership data of the first consumer in response to the first consumer viewing a first portion of the advertisement on a first device and viewing a second portion of the advertisement on a second device.

19. The non-transitory computer readable medium of claim 18, wherein the first portion of the advertisement includes a segment of the advertisement that comprises less than a full length of a runtime of the advertisement or a subset of advertisements of a plurality of advertisements intended to be viewed by the first consumer in the advertising campaign.

* * * * *